US008638469B2

(12) United States Patent
Usuda et al.

(10) Patent No.: US 8,638,469 B2
(45) Date of Patent: Jan. 28, 2014

(54) PRINTING APPARATUS AND PRINTING METHOD

(75) Inventors: Hidenori Usuda, Matsumoto (JP); Shinichi Kamoshida, Shiojiri (JP); Mitsuaki Yoshizawa, Kamiina-gun (JP)

(73) Assignee: Seiko Epson Corporation, Tokyo (JP)

( * ) Notice: Subject to any disclaimer, the term of this patent is extended or adjusted under 35 U.S.C. 154(b) by 522 days.

(21) Appl. No.: 12/754,673

(22) Filed: Apr. 6, 2010

(65) Prior Publication Data

US 2010/0259770 A1 Oct. 14, 2010

(30) Foreign Application Priority Data

Apr. 10, 2009 (JP) ................................ 2009-096329

(51) Int. Cl.
*G06F 15/00* (2006.01)
*G06F 3/12* (2006.01)

(52) U.S. Cl.
USPC .............. 358/1.2; 358/1.1; 358/1.13; 358/1.9

(58) Field of Classification Search
None
See application file for complete search history.

(56) References Cited

U.S. PATENT DOCUMENTS

| | | | | |
|---|---|---|---|---|
| 5,790,143 | A * | 8/1998 | Takada et al. | 347/16 |
| 6,795,104 | B2 | 9/2004 | Shiraiwa | |
| 2003/0017312 | A1 * | 1/2003 | Labrousse et al. | 428/195 |
| 2006/0158481 | A1 * | 7/2006 | Spevak et al. | 347/43 |
| 2007/0237557 | A1 * | 10/2007 | Yabuta | 399/381 |
| 2008/0218539 | A1 * | 9/2008 | Hill et al. | 347/7 |

FOREIGN PATENT DOCUMENTS

| | | | |
|---|---|---|---|
| CN | 1429711 | A | 7/2003 |
| JP | 2003-285422 | A | 10/2003 |
| JP | 2008-087153 | A | 4/2008 |

* cited by examiner

*Primary Examiner* — Thierry L Pham

(74) *Attorney, Agent, or Firm* — Nutter McClennen & Fish LLP

(57) ABSTRACT

A printing apparatus which prints an image on a medium, including a head which discharges ink droplets from nozzles, wherein the medium is transparent, two pieces of image data are prepared, one piece of image data is selected from the two pieces of image data to set the selected image data to one of a first image and a second image, the other piece of image data is set to the other of the first image and the second image, the image data set to the first image is subjected to a processing to be mirror image data, and the head prints the mirror image of the first image on the medium, prints a background image on the mirror image of the first image, and prints a real image of the second image on the background image.

5 Claims, 23 Drawing Sheets

PRINTING APPARATUS AND PRINTING METHOD

BACKGROUND

1. Technical Field

The present invention relates to a printing apparatus and a printing method by which an image is printed on a medium by discharging ink droplets from nozzles of a head.

2. Related Art

An ink jet printer is known as a printing apparatus. The printer prints an image on a medium by discharging ink droplets to the medium from nozzles of a head.

A transparent medium such as a transparent film, that is, a medium through which an opposite side can be seen, is used as the above medium in some cases. JP-A-2003-285422 describes a printer capable of switching a "surface print mode" and a "back print mode". In the "surface print mode", a white background image is printed on the transparent medium, and then a target image is printed on the background image in a superimposed manner. In the "backing print mode", a target image is printed on the transparent medium, and then a white background image is printed on the target image in a superimposed manner.

However, in the printer of the above technique, an image of a printed matter is visually recognized from only one side of the transparent medium while the background image is as a background. That is, the printer does not use both sides of one side and the other side of the transparent medium with respect to the background image for visually recognizing the image. Therefore, in the above technique, both sides of the transparent medium are not effectively used.

SUMMARY

An advantage of some aspects of the invention is to provide a technique of effectively using both sides of a transparent medium.

A printing apparatus according to an aspect of the invention, which prints an image on a medium, includes a head which discharges ink droplets from nozzles. In the printing apparatus, the medium is transparent, two pieces of image data are prepared, one piece of image data is selected from the two pieces of image data to set the selected image data to one of a first image and a second image, the other piece of image data is set to the other of the first image and the second image, the image data set to the first image is subjected to a processing to be mirror image data, and the head prints the mirror image of the first image on the medium, a background image on the mirror image of the first image, and a real image of the second image on the background image.

Other characteristics of the invention will be obvious from the following description and the accompanying drawings.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
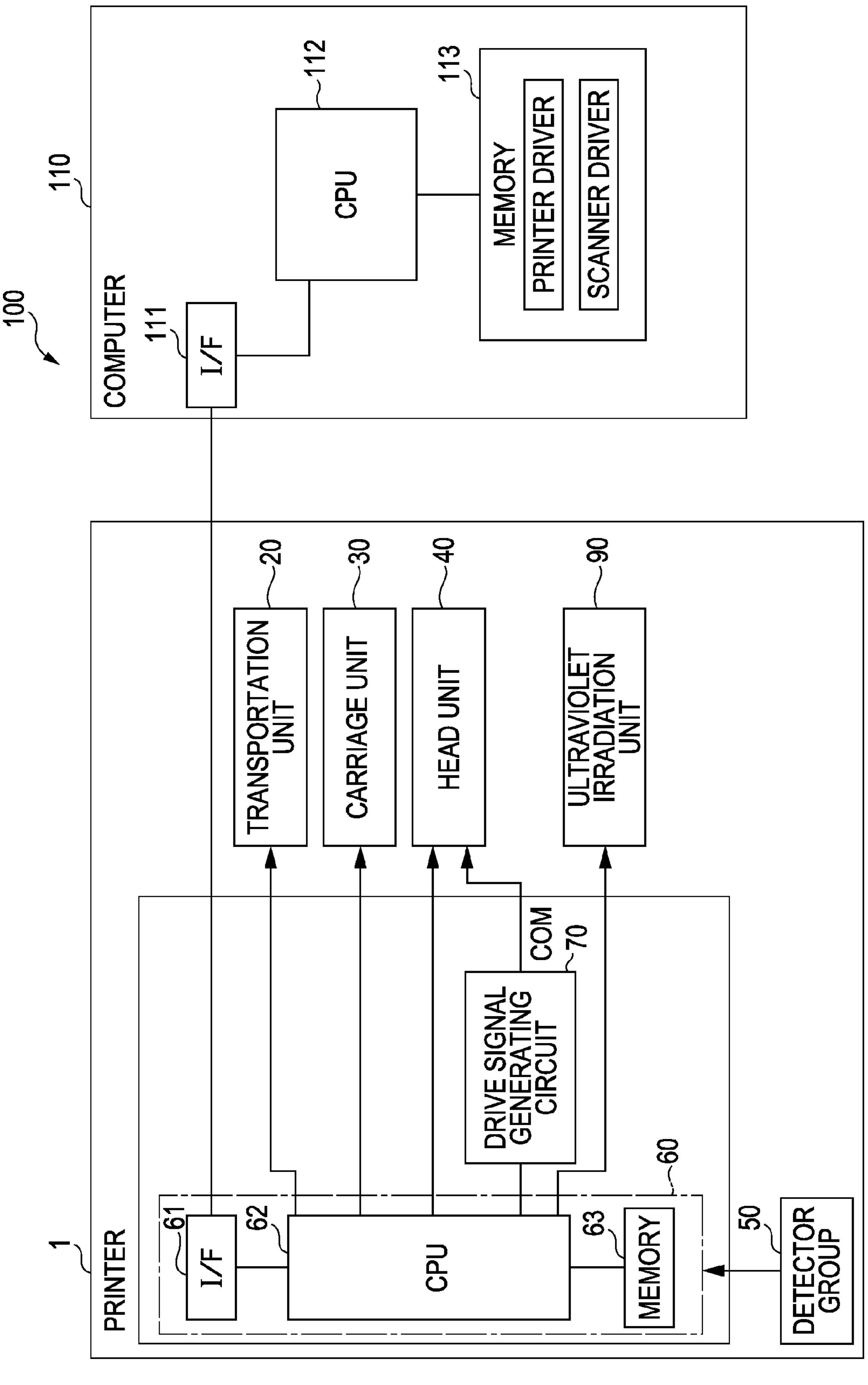
FIG. 1 is a block diagram illustrating a configuration of a printing system.

The present specification with the accompanying drawings makes at least following matters obvious.

A printing apparatus which prints an image on a medium, includes a head which discharges ink droplets from nozzles. In the printing apparatus, the medium is transparent, two pieces of image data are prepared, one piece of image data is selected from the two pieces of image data to set the selected image data to one of a first image and a second image, the other piece of image data is set to the other of the first image and the second image, the image data set to the first image is subjected to a processing to be mirror image data, and the head prints the mirror image of the first image on the medium, a background image on the mirror image of the first image, and a real image of the second image on the background image.

With this configuration, both sides of the transparent medium can be effectively used.

In the printing apparatus, it is preferable that one of the first image and the second image be an additional image of which print area is smaller than that of the other image. Further, it is preferable that the print resolution of the first image be different from that of the second image. In addition, the additional image may be set to the second image. The printing apparatus may include a mode selection unit and it is preferable that when a transmission mode is selected, the selected image data be set to the first image without the processing to be a mirror image and the other image data not selected is set to the second image, and the head prints a real image of the first image on the medium, a background image on the real image of the first image, and a real image of the second image on the background image.

Further, it is preferable that ink for a background image color have a property that the ink is cured when irradiated with ultraviolet rays, and when the transmission mode is selected, the transmission density of the background image be changed by changing an amount of the ultraviolet rays irradiated on the ink for the background image color. In addition, the transmission density of the background image may be changed by changing an amount of the ink per predetermined area for the background image printed on the medium.

With this configuration, both sides of the transparent medium can be effectively used.

A printing method includes preparing two pieces of image data, selecting one piece of image data from the two pieces of image data to set the selected image data to one of a first image and a second image, setting the other piece of image data to the other of the first image and the second image, subjecting the image data set to the first image to a processing to be mirror image data, and printing the mirror image of the first image on the transparent medium, the background image on the mirror image of the first image, and a real image of the second image on the background image.

With this method, both sides of the transparent medium can be effectively used.

First Embodiment

Printing System

FIG. 1 is a block diagram illustrating a configuration of a printing system 100. The printing system 100 according to the first embodiment includes a printer 1 and a computer 110 as shown in FIG. 1.

The printer 1 is a printing apparatus which ejects ink onto a medium so as to form (print) an image on the medium. In the first embodiment, the printer 1 is a serial type color ink jet printer. The printer 1 can print an image on various kinds of media such as a film sheet S. A configuration of the printer 1 will be described later.

The computer 110 includes an interface 111, a CPU 112 and a memory 113. The interface 111 transmits and receives data to and from the printer 1. The CPU 112 entirely controls the computer 110 and executes various types of programs installed in the computer 110. The memory 113 stores various types of programs and various types of data. There is a printer driver among programs installed in the computer 110. The printer driver is a program for converting image data output from an application program to print data. The computer 110 outputs the print data generated by the printer driver to the printer 1.

Configuration of Printer

Figure 2A:
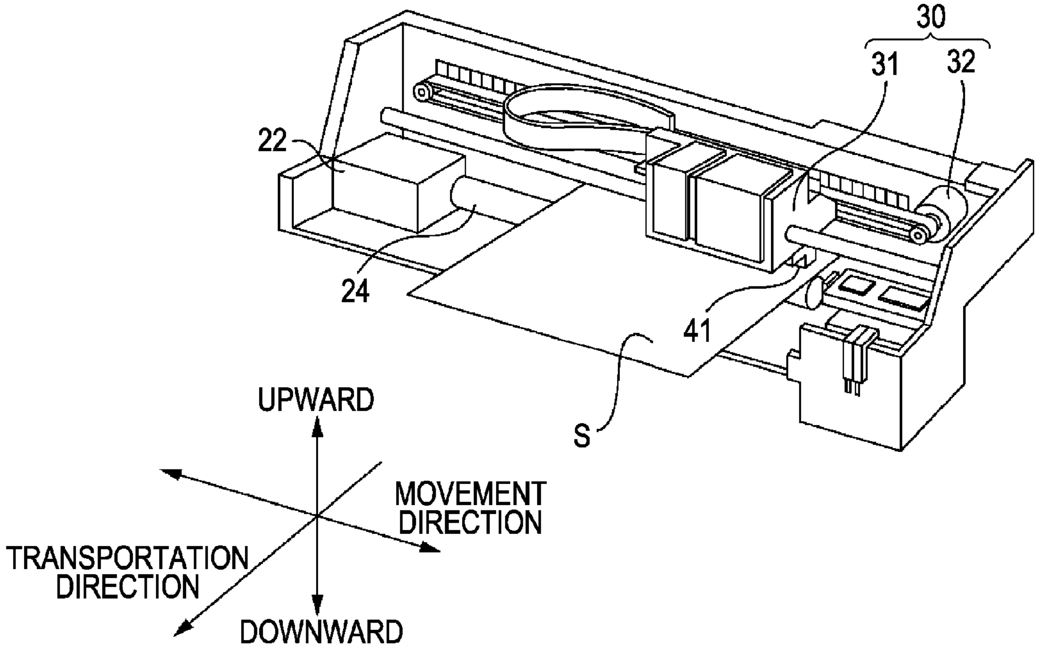
FIG. 2A is a schematic diagram illustrating an overall configuration of a printer.
Figure 2B:
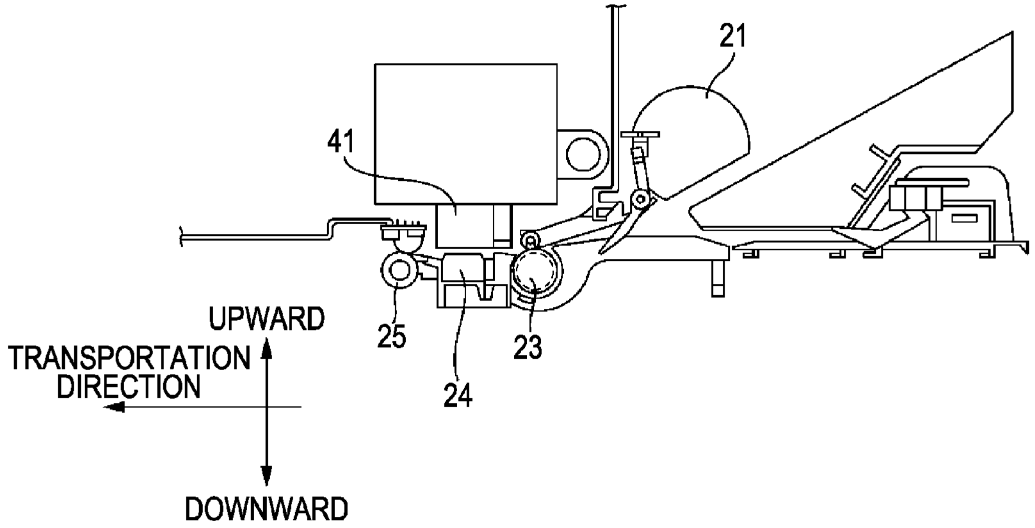
FIG. 2B is a cross-sectional diagram illustrating the overall configuration of the printer.

FIG. 2A is a schematic diagram illustrating an overall configuration of the printer 1. FIG. 2B is a cross-sectional diagram illustrating the overall configuration of the printer 1.

The printer 1 includes a transportation unit 20, a carriage unit 30, a head unit 40, a detector group 50, a controller 60, a driving signal generation circuit 70, and an ultraviolet irradiation unit 90.

In the printer 1, each unit (the transportation unit 20, the carriage unit 30, the head unit 40, the driving signal generation circuit 70, and the ultraviolet irradiation unit 90) is controlled by the controller 60. The controller 60 controls each unit based on print data received from the computer 110 to print an image on a medium such as the film sheet S. A film sheet used in the first embodiment is a sheet of which opposite side can be seen through the film. It is to be noted that a transparent medium used in the embodiment may be a semi-transparent medium, or other see-through media.

The transportation unit 20 enables the film sheet S to be transported in a predetermined direction (hereinafter, referred to as a transportation direction). The transportation unit 20 includes a sheet feeding roller 21, a transportation motor 22, a transportation roller 23, a platen 24, and a sheet discharging roller 25. The sheet feeding roller 21 is a roller for feeding the film sheet S inserted to a medium insertion port into the printer. The transportation roller 23 is a roller for transporting the film sheet S fed by the sheet feeding roller 21 to a printable area. The transportation roller 23 is driven by the transportation motor 22. The platen 24 supports the film sheet S being printed. The sheet discharging roller 25 is a roller for discharging the film sheet S outside the printer. The sheet discharging roller 25 is provided on the downstream side with respect to the printable area in the transportation direction. The sheet discharging roller 25 rotates in synchronization with the transportation roller 23.

The carriage unit 30 enables a head to be moved in a predetermined direction (movement direction in FIG. 2A). The carriage unit 30 includes a carriage 31 and a carriage motor 32. The carriage 31 is capable of moving forward and backward in the movement direction and is driven by the carriage motor 32. The carriage 31 holds an ink cartridge containing ink in a detachable manner.

The head unit 40 enables ink to be discharged onto a film sheet. The head unit 40 includes a head 41 having a plurality of nozzles. Since the head 41 is provided on the carriage 31 as the head unit 40, if the carriage 31 moves in the movement direction, the head 41 also moves in the movement direction. The head 41 intermittently discharges ink while moving in the movement direction so that a dot line (raster line) along the movement direction is formed on the film sheet S. An internal configuration of the head will be described later.

The detector group 50 indicates various detectors that detect pieces of information of each component of the printer 1 to output the detected information to the controller 60. The controller 60 is a control unit for controlling the printer. The controller 60 includes an interface unit 61, a CPU 62, and a memory 63. The interface unit 61 transmits and receives data between the computer 110 as an external apparatus and the printer 1. The CPU 62 is an arithmetic processing unit for controlling the entire printer. The memory 63 is a unit to ensure a region storing programs or an operational region of the CPU 62. The memory 63 includes a storage element such as RAM, EEPROM or the like. The CPU 62 controls each unit in accordance with the programs stored in the memory 63.

The driving signal generation circuit 70 generates a driving signal for enabling ink droplets to be discharged by application of the signal to a driving element such as a piezoelectric element included in the head, which will be described later. The driving signal generation circuit 70 includes a DAC (not shown). With the DAC, the driving signal generation circuit 70 generates an analog voltage signal based on digital data relating to a waveform of the driving signal transmitted from the controller 60. The driving signal generation circuit 70 also includes an amplifying circuit (not shown). With the amplifying circuit, the driving signal generation circuit 70 electrically amplifies the generated voltage signal to generate a driving signal.

The ultraviolet irradiation unit 90 is an apparatus that irradiates the above ultraviolet cure ink with ultraviolet rays for curing the ink. In the first embodiment, the ultraviolet irradiation unit 90 is formed with an LED or the like and is provided on the head 41. When the head 41 is moved by the carriage unit 30, the ultraviolet irradiation unit 90 moves in the movement direction of the head 41. The intensity of the ultraviolet rays irradiated by the ultraviolet irradiation unit 90 is controlled by the controller 60.

Figure 3:
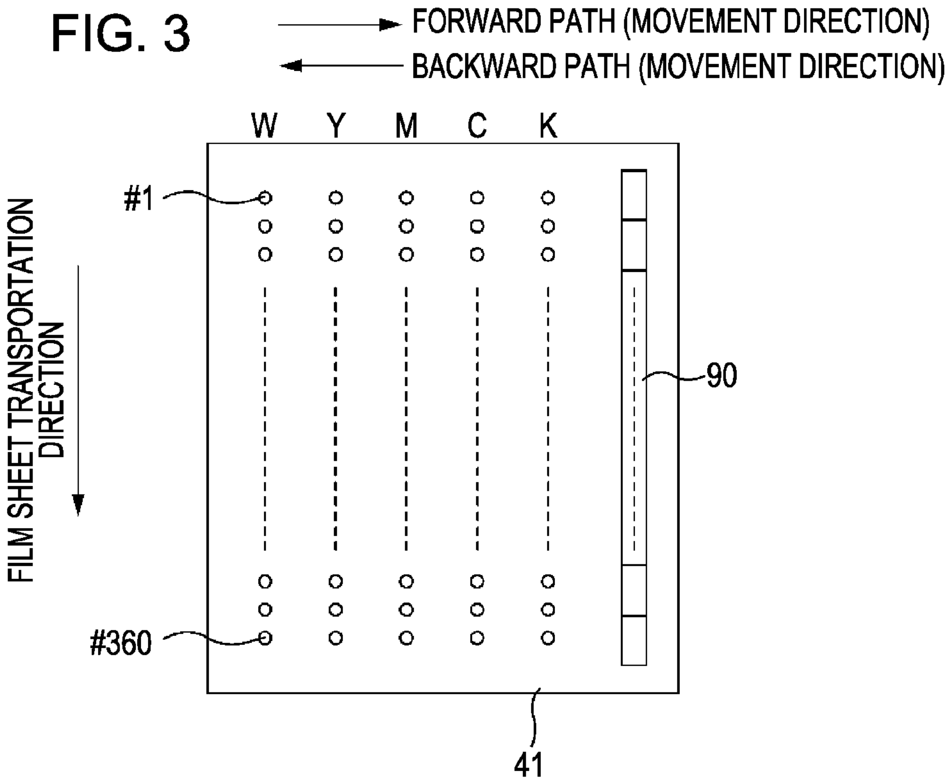
FIG. 3 is a diagram explaining a nozzle arrangement in a head of a head unit.

FIG. 3 is a diagram explaining a nozzle arrangement in the head 41 of the head unit 40. It is to be noted that the nozzle rows are shown while observed from the top for simplification of explanation although the nozzle rows can be seen only from the bottom in a normal situation.

A black ink nozzle row K, a cyan ink nozzle row C, a magenta ink nozzle row M, a yellow ink nozzle row Y and a white ink nozzle row W are formed on the head 41. Each nozzle row includes a plurality of nozzles (360 nozzles in this case) from which ink is discharged. The plurality of nozzles in each nozzle row are arranged at a constant nozzle pitch (360 dpi in this case) along the transportation direction of the film sheet S.

Further, the ultraviolet irradiation unit 90 for curing the ultraviolet cure ink is attached to the head 41. The ultraviolet irradiation unit 90 is formed with an LED or the like capable of irradiating ultraviolet rays.

By providing the ultraviolet irradiation unit 90 in such a manner, dots are formed in the forward path in the movement direction of the head 41 and the formed dots are irradiated with the ultraviolet rays in the backward path. Then, the dots formed in the forward path are cured in the backward path of the head 41. It is to be noted that the intensity of the ultraviolet rays irradiated by the ultraviolet irradiation unit 90 may be changed depending on a selected mode as described later.

Figure 4:
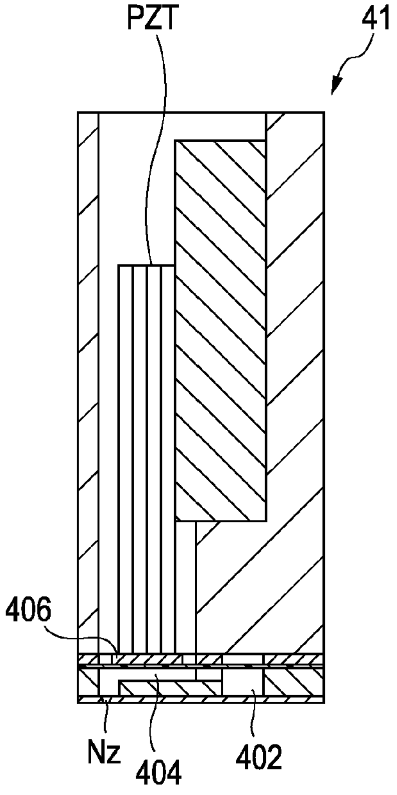
FIG. 4 is a diagram explaining a configuration of the head.

FIG. 4 is a diagram explaining a configuration of the head. A nozzle Nz, a piezoelectric element PZT, an ink supply path 402, a nozzle communicating path 404, and an elastic plate 406 are shown in FIG. 4.

Ink is supplied from an ink tank (not shown) to the ink supply path 402. Then, the ink is supplied to the nozzle communicating path 404. A driving pulse of a driving signal which is described later is applied to the piezoelectric element PZT. When the driving pulse is applied, the piezoelectric element PZT is contracted in accordance with the signal of the driving pulse to vibrate the elastic plate 406. Then, ink droplets whose amount corresponds to the amplitude of the driving pulse are discharged from the nozzle Nz.

Figure 5:
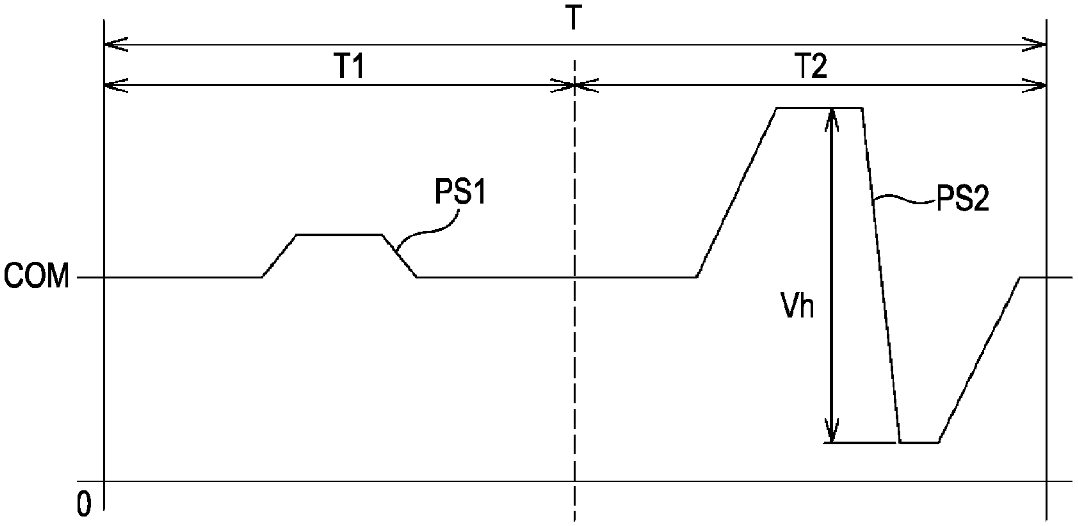
FIG. 5 is a diagram explaining a driving signal COM.

FIG. 5 is a diagram explaining a driving signal COM. The driving signal COM is repeatedly generated every repeating period T. The repeating period T corresponds to a period during which the head moves by one pixel on the film sheet S. For example, when the print resolution in the movement direction of the head is 360 dpi, the period T corresponds to a period during which the head moves 1/360 inch. A micro-vibration pulse PS1 or a driving pulse PS2 at intervals included in the period T is applied to the piezoelectric element PZT based on the pixel data included in print data. This makes it possible that dots are or are not formed in one pixel.

The driving signal COM has the micro-vibration pulse PS1 generated in an interval T1 in the repeating period and the driving pulse PS2. The micro-vibration pulse PS1 is a pulse for micro-vibrating an ink face (ink meniscus) of the nozzle. When the micro-vibration pulse PS1 is applied, ink is not ejected from the nozzle. On the other hand, the driving pulse PS2 is a driving pulse for ejecting ink from the nozzle. When the driving pulse PS2 is applied, ink is ejected from the nozzle.

In FIG. 5, the amplitude of the driving pulse PS2 refers to as Vh. When the amplitude is increased, ink droplets having a larger size are ejected. In contrast, when the amplitude is decreased, ink droplets having a smaller size are ejected.

Figure 6:
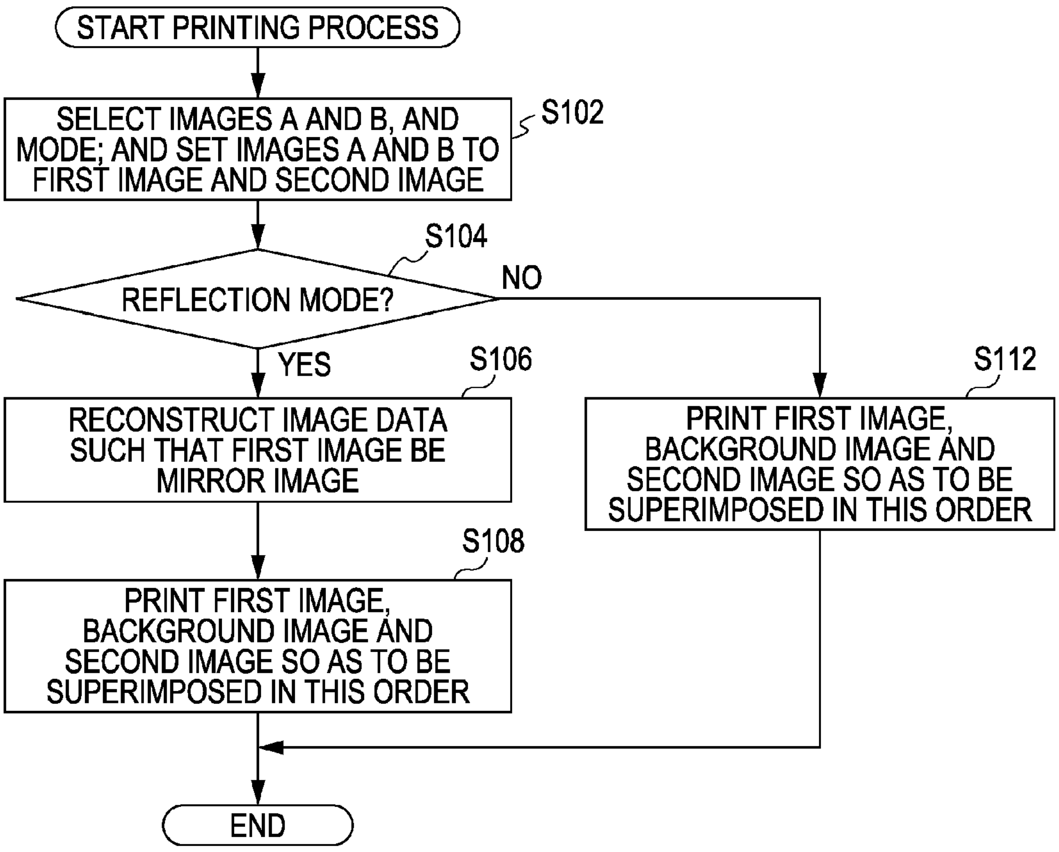
FIG. 6 is a flowchart explaining a printing process according to a first embodiment.

FIG. 6 is a flowchart explaining a printing process according to the first embodiment.

At first, images to be printed and a print mode are selected (S102). Two images (image data A, image data B) are selected as selection image (image data). Then, one image is set to be a first image, and the other image is set to be a second image. In selecting images, image data selected by a user among images displayed on a display unit (such as a monitor) included in the printer or an apparatus independent of the printer may be set to the selection image. Further, image data received from another apparatus or image data stored in the memory may be set to the selection image.

The two pieces of image data may be independently selected. Alternatively, when one of the two pieces of image data is selected, image data previously related to the selected image data may be selected as the other image data. For example, when one image data is an image of a target, the other image data may be image data which is an image indicating information relating to the target or may be obtained by converting information previously related to a tag or the like of the above image data to image data. In addition, the two pieces of image data may be stored in the memory or the like in a state where the two pieces of image data are previously related to each other.

At step S102, a print mode is also selected. Either of a reflection mode or a transmission mode is selected through a user interface.

Next, the selected mode is determined to be the reflection mode or the transmission mode (S104). Then, when the reflection mode is selected, the process at S106 is executed. On the other hand, when the transmission mode is selected, a process at S112 is executed.

When the reflection mode is selected, image data is reconstructed such that the first image is a mirror image.

Figure 7:
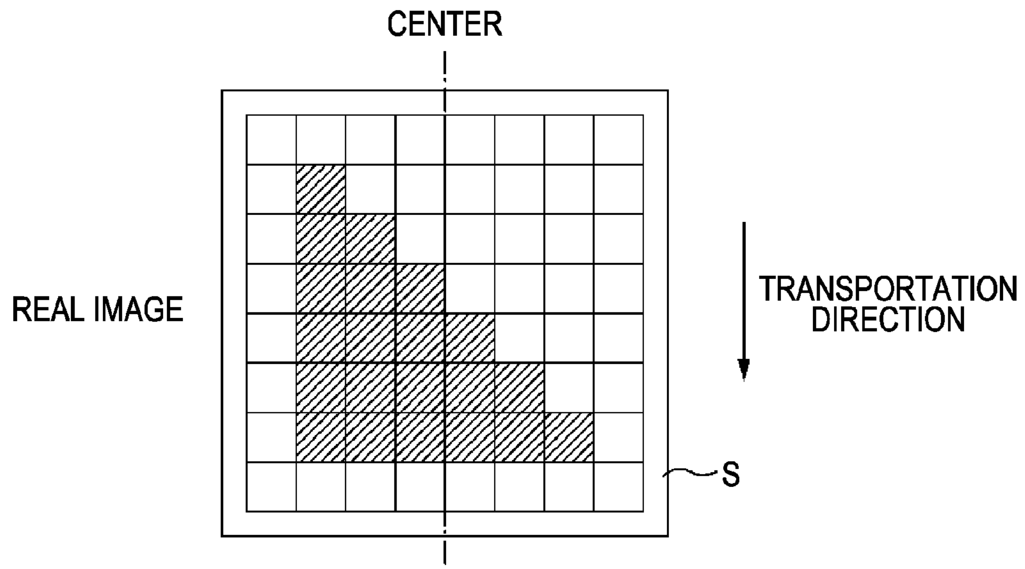
FIG. 7 is a diagram explaining a real image.
Figure 8:
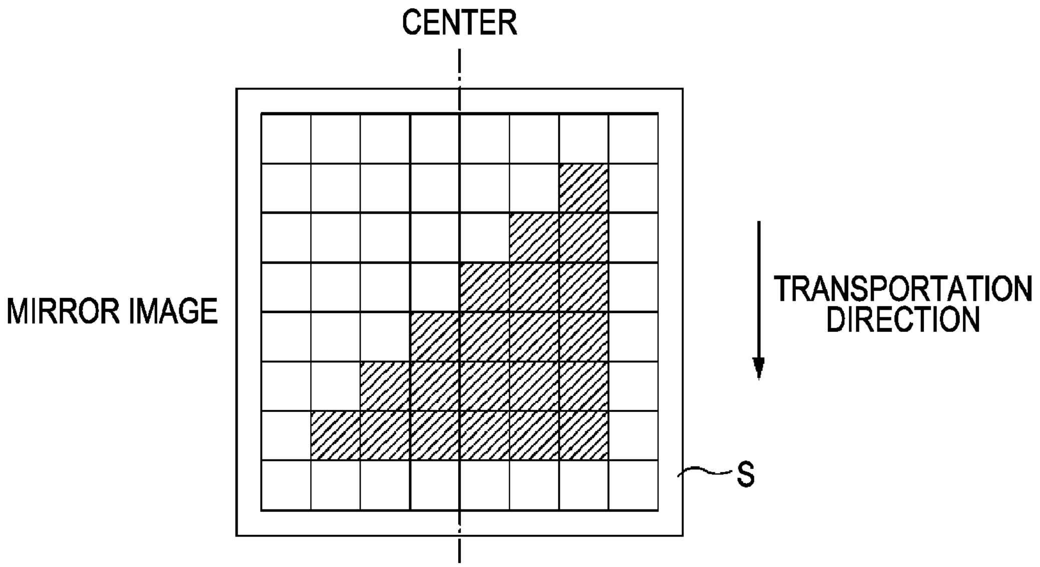
FIG. 8 is a diagram explaining a mirror image with respect to the real image.

FIG. 7 is a diagram explaining a real image. FIG. 8 is a diagram explaining a mirror image with respect to the real image. FIG. 7 and FIG. 8 show pixels at which dots are formed, and such pixels are shown to be hatched. It is to be noted that the number of pixels on the film sheet S to be printed is reduced in FIG. 7 and FIG. 8 for simplification of explanation.

In the first embodiment, when real image data is converted to mirror image data, image data is reconstructed to be a left-right reversed mirror image while the center of the film sheet S in the width direction is as an axis. Comparing FIG. 7 and FIG. 8, dots to be formed are counterchanged between FIG. 7 and FIG. 8 while the center of the film sheet S in the width direction is as an axis. In such a manner, the real image data is reconstructed so as to be mirror image data.

A process of converting image data to mirror image data is not limited to the above method as long as the order of pixels included in the image data is rearranged so as to be left-right reversed when seen from the direction visually recognized after being printed.

Next, a first image, a background image and a second image are printed on the film sheet S so as to be superimposed in this order.

Figure 9:
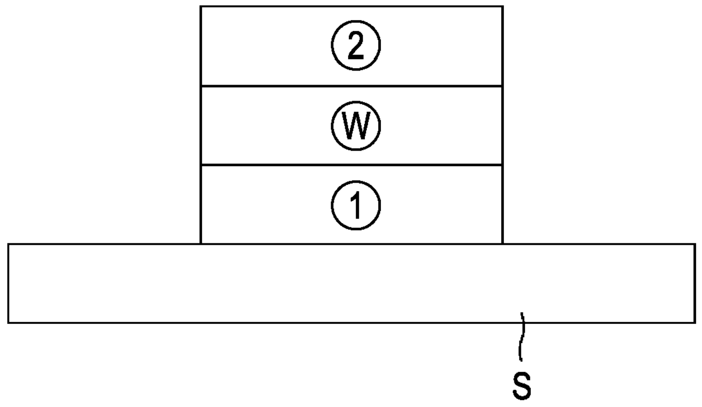
FIG. 9 is a diagram explaining the order of superimposed inks.

FIG. 9 is a diagram explaining the order of superimposed inks. The order of dots to be formed on the film sheet S in a superimposed manner is shown in FIG. 9. As shown in FIG. 9, the first image (mirror image) is formed on the film sheet S, a white ink is overcoated on the first image as the background image, then the second image (real image) is formed on the overcoated white ink.

Thus, the first image and the second image which are different from each other are printed while sandwiching the background image (white ink). Therefore, information amount loaded on the film sheet by the images can be increased approximately twice. Then, the film sheet itself and the space for installing the film sheet can be saved.

On the other hand, when it is determined that the transmission mode is selected (the reflection mode is not selected) at S104, the first image, the background image and the second image are printed so as to be superimposed on the film sheet S in this order. In this case, the background image is printed such that the second image can be seen through from the first image side, or such that the first image can be seen through from the second image side (S112). The background image printed in the transmission mode has a higher transmission density than that of the background image in the case where the reflection mode is selected.

The transmission density (transmissibility) is a characteristic obtained by measuring, in a visible light, a transmission density of a medium on which the background image has been printed. The higher the transmission density is, the easier the light is transmitted. The transmission density can be measured with an existing transmission densitometer. When the background image is printed with the same ink, the transmission density can be higher by reducing the amount of the ink for printing the background image per predetermined area of the medium. When the background image is printed with different background color inks, the transmission density can be higher by using ink containing a small amount of white pigment. In addition, the transmission density of the background image can be changed by including nozzle rows corresponding to a plurality kind of the background color inks in the head of the printer, selecting the nozzle row depending on the mode, and using the selected nozzle row for printing. In the case of using UV ink, the transmission density can be changed by changing the irradiation condition. In the first embodiment, when the transmission density is measured, the transmission density of the background image (second background image) in the transmission mode is higher than that of the background image (first background image) in the reflection mode.

Figure 10A:
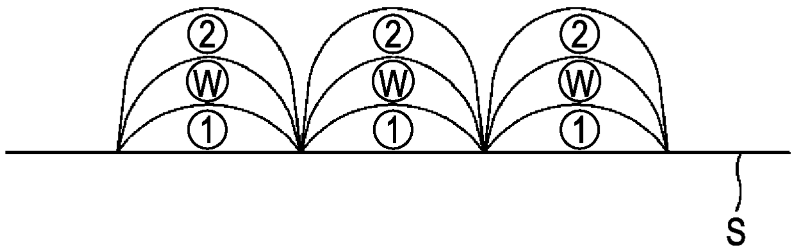
FIG. 10A is a diagram explaining a state of superimposed inks of a first image to a second image in a reflection mode.
Figure 10B:
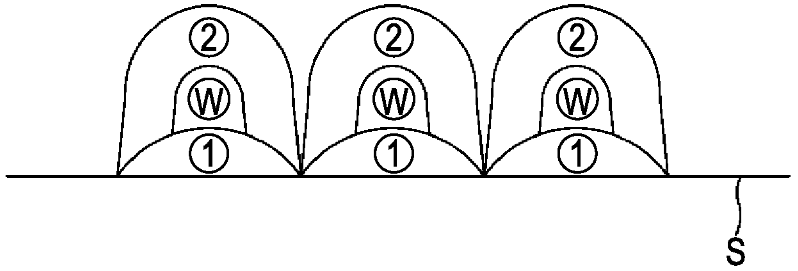
FIG. 10B is a diagram explaining a state of superimposed inks of the first image to the second image in a transmission mode.

FIG. 10A is a diagram explaining a state of superimposed inks of the second image upon the first image in the reflection mode. FIG. 10B is a diagram explaining a state of superimposed inks of the second image upon the first image in the transmission mode. In the reflection mode as shown in FIG. 10A, white ink substantially covers the entire first image ink. Therefore, it is difficult that the first image is visually recognized from the second image side (or the second image is visually recognized from the first image side). On the other hand, in the transmission mode as shown in FIG. 10B, white ink does not cover the entire dot of the first image. Therefore, it is easy that the first image is visually recognized from the second image side (or the second image is visually recognized from the first image side).

In order that white ink does not cover the entire dot of the first image, the irradiation intensity of the ultraviolet rays after landing of ink of white W is increased in comparison with that in the reflection mode. This enables ink of white W to be cured before the ink is spread. Thus, the first image can be seen through from the second image side so as to realize the transmission mode.

Figure 10C:
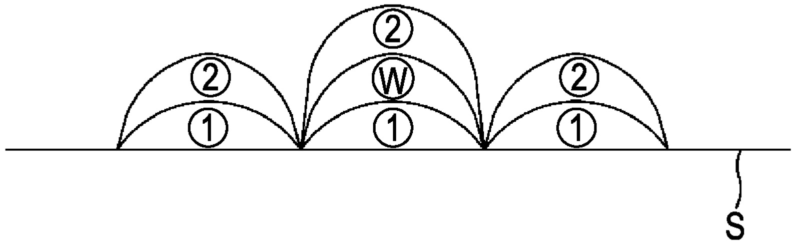
FIG. 10C is a diagram explaining a state of superimposed inks of the first image to the second image in a transmission mode when white dots are thinned out.

FIG. 10C is a diagram explaining a state of superimposed inks of the second image upon the first image in the transmission mode when white dots are thinned out. In comparison with FIG. 10A, there are places where ink of white W is not formed on the dot of the first image in FIG. 10C. In order that the places where ink of white W is not formed on the dot of the first image are provided, image data of the background image in which pixels are provided without dot information is used. In this manner, the first image can be seen through the second image so as to realize the transmission mode.

If the ink amount per ink droplet, that is, the ink amount printed per pixel is the same, the ink amount printed per predetermined area of the medium is increased as the resolution is higher. Further, if the ink amount printed per pixel is increased at the same resolution, the ink amount printed per predetermined area of the medium is increased. The above resolution means that dots are formed on all of the pixels per predetermined area, which are defined by the resolution. However, the number of pixels on which dots are actually formed among pixels defined by the resolution is changed so as to change the ink amount printed per predetermined area of the medium. In addition, even in the case of the background image of which ink amount printed per pixel and resolution are the same, the ink amount printed per predetermined area of the medium can be increased by printing a plurality of times in a superimposed manner.

When printing in the transmission mode at S112 is executed, a transmission mode where images are visually recognized from the first image side while the background image is as a background or a transmission mode where images are visually recognized from the second image side while the background image is as a background is selected. When the former transmission mode is selected, the process at S112 is executed. On the other hand, when the latter transmission mode is selected, the process at S112 may be executed after image data is reconstructed such that image data of both the first image and the second image are mirror images.

Both images may be picture images or the like. In this case, for example, a user may select which of the two images is set to be the first image or the second image as described above.

In each of the above modes, either one of the two images may be additional information relating to the printed matter. The additional information is obtained by forming image data from various pieces of information relating to the image added with the additional image. The information includes a picture number, information relating to the target on the picture, print number, information relating to the printing apparatus, and information relating to print medium, for example. Further, one of the two images may be an image for demonstration as additional information.

In many cases, the additional image has smaller amount of information than the image to be added with the additional image or is character information. Therefore, the additional image can be printed at a low print resolution.

Image data set at first at S102 may be the second image, or the first image. Which one of the two images is set to be the first image or the second image may be selected by a user as described above, or may be set by a controller of the printer or another apparatus. In this case, the image may be set in accordance with the contents of the image data. For example, when the two pieces of image data are a picture image and a character image, the picture image may be set to the first image. If the picture image is set to the first image, the printed matter where the picture image is visually recognized from the back side through the transparent medium is obtained. Therefore, it is preferable because the picture image can be printed clearer than the second image and the surface of the picture image is hardly contaminated.

In addition, the printed matter is suitably utilized for an identification photo, an ID card, a product tag or a business card.

Although the mode is selected at S102, such a selection of the mode may be omitted. In such a case, the process at S104 is skipped and the process proceeds to S106.

Hereinafter, operations in which the first image, the background image and the second image are printed by the head of the printer 1 in the first embodiment is described.

Figure 11:
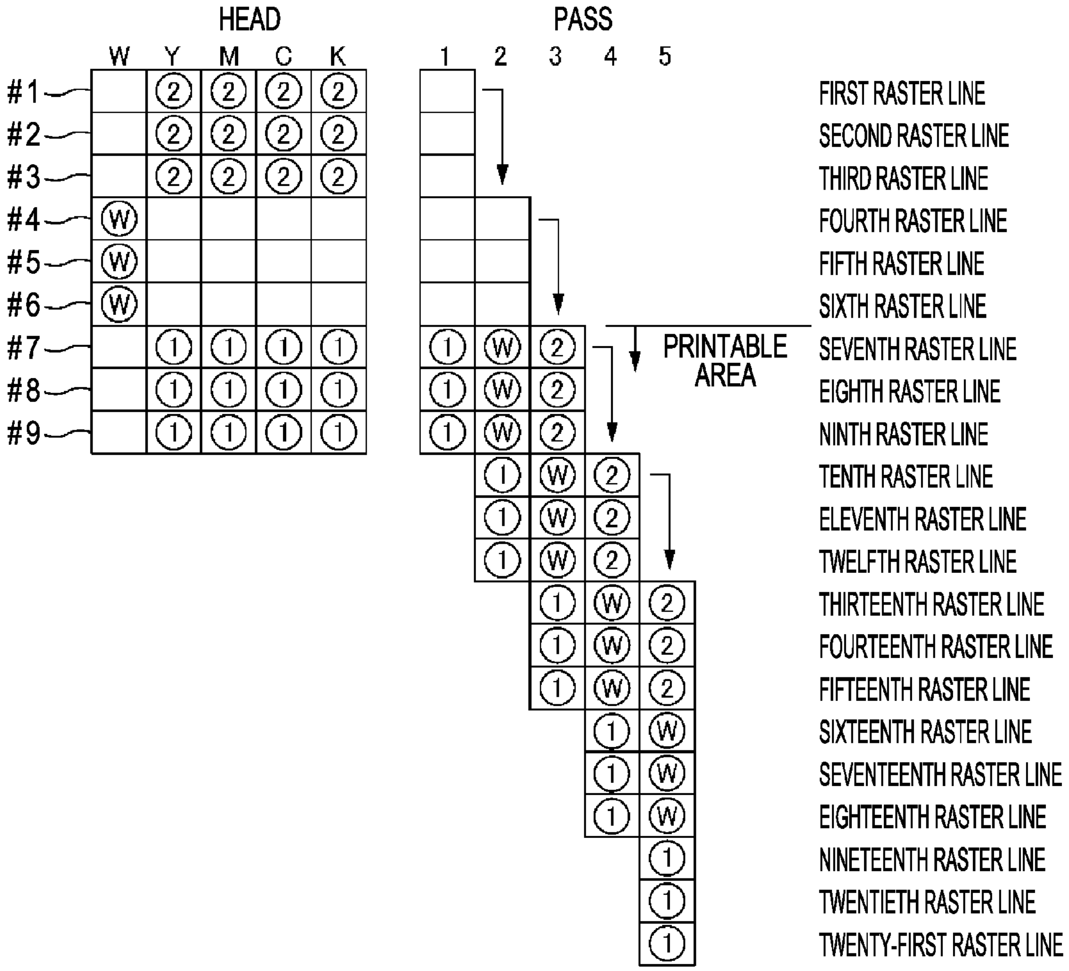
FIG. 11 is a diagram explaining a band printing according to the first embodiment.

FIG. 11 is a diagram explaining a band printing according to the first embodiment. As shown in FIG. 11, a head includes nozzle rows of white W, yellow Y, magenta M, cyan C and black K. Each nozzle row is assumed to have nine nozzles and nozzle numbers of #1 to #9 are assigned to the nine nozzles, respectively, for simplification of explanation. On the right side of the head in FIG. 11, which nozzles form dots on raster lines at each pass is shown.

Referring again to FIG. 9, a circled reference numeral "1" corresponds to a layer forming the first image. A circled reference numeral "2" corresponds to a layer forming the second image. A circled reference symbol "W" corresponds to a layer forming the background image with white ink. In FIG. 11, these circled reference numerals and symbols also correspond in the same way. That is, a circled reference numeral "1" corresponds to a nozzle forming the first image, a circled reference numeral "2" corresponds to a nozzle forming the second image and a circled reference symbol "W" corresponds to a nozzle forming the background image with white ink. It is to be noted that nozzles which are not indicated by any of these reference numerals and symbol correspond to not-available nozzles.

In each pass, a circled reference numeral "1" corresponds to a nozzle forming dots of the first image, a circled reference numeral "2" corresponds to a nozzle forming dots of the second image and a circled reference symbol "W" corresponds to a nozzle forming dots of the background image with white ink.

In the following description, in each pass, ink is discharged in the forward path of the head 41 and the ink is irradiated with ultraviolet rays by the ultraviolet irradiation unit 90 in the backward path of the head 41 so that the discharged ink is cured. The intensity of the ultraviolet rays irradiated by the ultraviolet irradiation unit 90 is changed depending on the mode selected as described above. That is to say, when the transmission mode is selected, the intensity of the ultraviolet rays can be higher than that in the case where the reflection mode is selected.

Referring to FIG. 11, the printable area is from a seventh raster line downward. For example, dots of the first image are formed on the film sheet S with the nozzles #7 to #9 of YMCK in pass 1 on the seventh raster line to the ninth raster line. In this case, the film sheet S is transported by three nozzle pitches in the transportation direction every time one pass is completed. As shown in FIG. 11, the positions of the raster lines at which dots are formed are moved as shown by arrows in FIG. 11 as the film sheet S is relatively moved in the transportation direction.

Dots of the background image are formed on the first image with the nozzles #4 to #6 of white W in pass 2. Further, dots of the second image are formed on the background image with the nozzles #1 to #3 of YMCK in pass 3. Subsequently, the same printing processes are executed so that the first image is printed on the film sheet S, the background image is printed on the first image, and then the second image is printed on the background image at the printable area.

Thus, when the reflection mode is selected, the first image can be seen through the film sheet S and the second image can be seen from the opposite side of the film sheet S. Further, when the transmission mode is selected, the first image and the second image can be seen from both sides of the film sheet S.

The degree of the transmission of the background image with ink of white W is changed by changing the intensity of the ultraviolet rays irradiated in the backward path depending on the selected mode. However, as described above, the degree of the transmission of the background image with ink of white W may be changed by using image data of the background image formed by thinning out the white dots.

Figure 12:
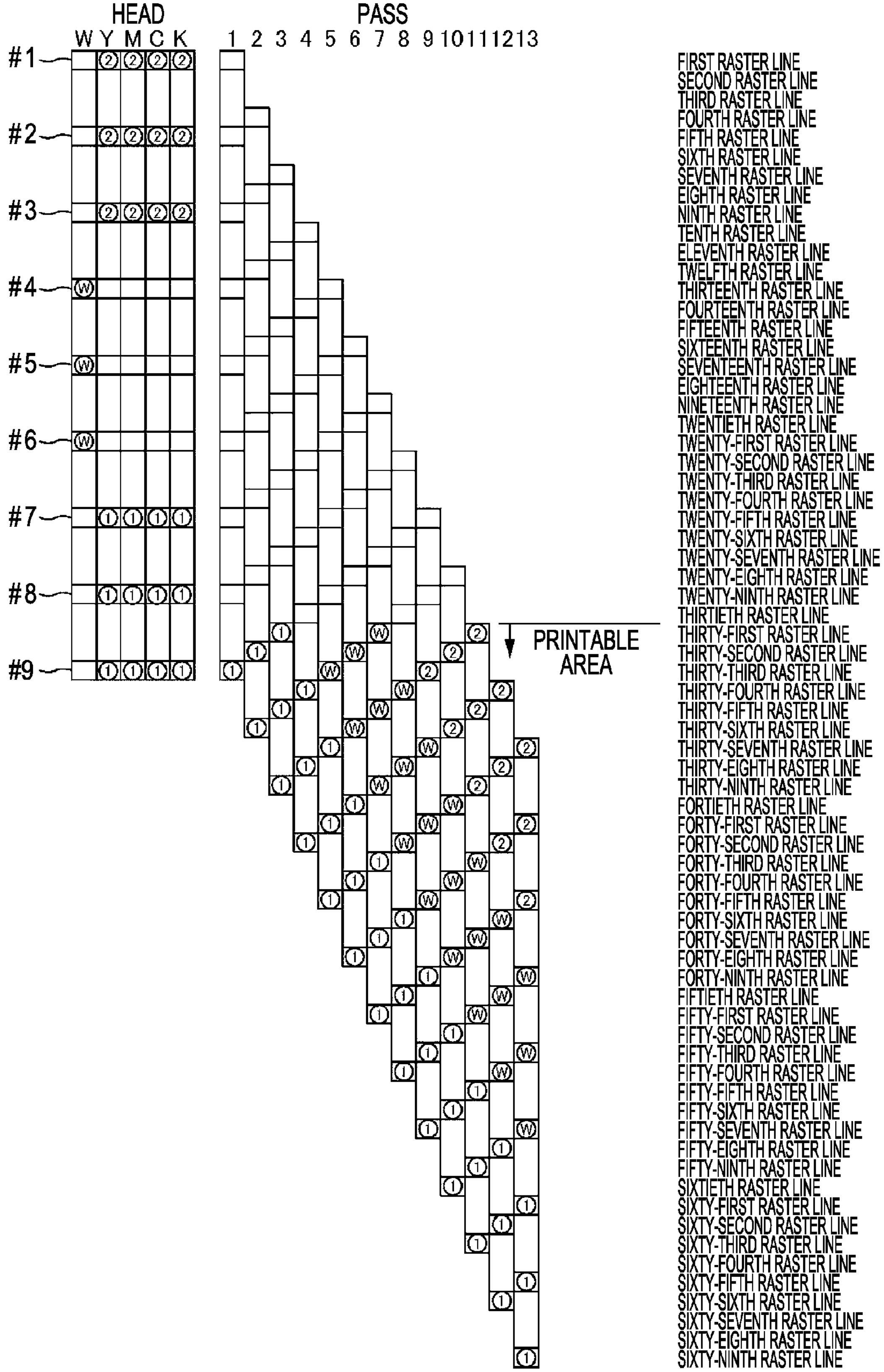
FIG. 12 is a diagram explaining an interlace printing according to the first embodiment.

FIG. 12 is a diagram explaining an interlace printing according to the first embodiment. As shown in FIG. 12, the head includes nozzle rows of white W, yellow Y, magenta M, cyan C and black K. Each nozzle row is assumed to have nine nozzles for simplification of explanation. On the right side of the head in FIG. 12, which nozzles form dots on raster lines at each pass is shown.

Also in FIG. 12, a circled reference numeral "1" corresponds to a nozzle forming the first image, a circled reference numeral "2" corresponds to a nozzle forming the second image and a circled reference symbol "W" corresponds to a nozzle forming the background image with white ink. Further, in each pass, a circled reference numeral "1" corresponds to a nozzle forming dots of the first image, a circled reference numeral "2" corresponds to a nozzle forming dots of the second image and a circled reference symbol "W" corresponds to a nozzle forming dots of the background image with white ink.

In the following description, in each pass, ink is discharged in the forward path of the head 41 and the ink is irradiated with ultraviolet rays by the ultraviolet irradiation unit 90 in the backward path of the head 41 so that the discharged ink is cured. The intensity of the ultraviolet rays irradiated by the ultraviolet irradiation unit 90 is changed depending on the mode selected as described above. That is to say, when the transmission mode is selected, the intensity of the ultraviolet ray can be higher than that in the case where the reflection mode is selected.

Referring to FIG. 12, the printable area is from a thirty-first raster line downward. The order of formation of dots is described with reference to the thirty-first raster line to a thirty-third raster line, for example.

Dots of the first image are formed on the thirty-third raster line on the film sheet S with the nozzle #9 of YMCK in pass 1. In this case, the film sheet S is transported by ¾ nozzle pitch in the transportation direction every time one pass is completed.

Then, dots of the first image are formed on the thirty-second raster line on the film sheet S with the nozzle #8 of YMCK in pass 2. Dots of the first image are formed on the thirty-first raster line on the film sheet S with the nozzle #7 of YMCK in pass 3. Dots of the first image are formed with the nozzle #7 and the like of YMCK in pass 4. However, dots are not formed on the thirty-first raster line to the thirty-third raster line in pass 4.

Dots of the background image are formed on the thirty-third raster line on the first image with the nozzle #6 of white W in pass 5. Dots of the background image are formed on the thirty-second raster line on the first image with the nozzle #5 of white W in pass 6. Dots of the background image are formed on the thirty-first raster line on the first image with the nozzle #4 of white W in pass 7. Dots of the background image are formed with the nozzle #4 of white W and the like in pass 8. However, dots are not formed on the thirty-first raster line to the thirty-third raster line in pass 8.

Dots of the second image are formed on the thirty-third raster line on the background image with the nozzle #3 of YMCK in pass 9. Dots of the second image are formed on the thirty-second raster line on the background image with the nozzle #2 of YMCK in pass 10. Dots of the second image are formed on the thirty-first raster line on the background image with the nozzle #1 of YMCK in pass 11.

Subsequently, the same printing processes are executed so that the first image is printed on the film sheet S, the background image is printed on the first image, and then the second image is printed on the background image at the printable area.

Figure 13:
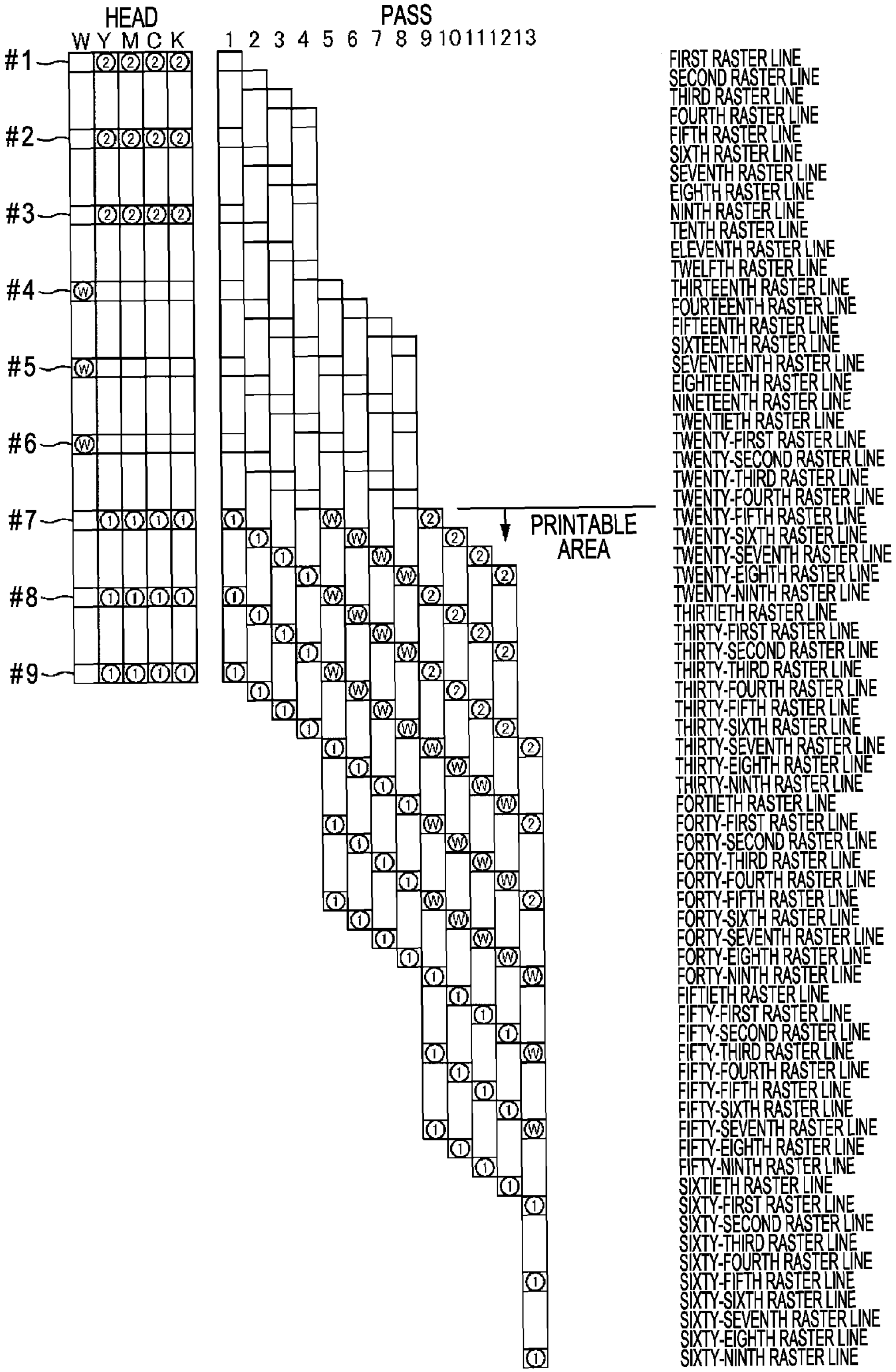
FIG. 13 is a diagram explaining a micro-feed printing according to the first embodiment.

FIG. 13 is a diagram explaining a micro-feed printing according to the first embodiment. As shown in FIG. 13, a head includes nozzle rows of white W, yellow Y, magenta M, cyan C and black K. Each nozzle row is assumed to have nine nozzles and nozzle numbers of #1 to #9 are assigned to the nine nozzles, respectively, for simplification of explanation. On the right side of the head in FIG. 13, which nozzles form dots on raster lines at each pass is shown.

Also in FIG. 13, a circled reference numeral "1" corresponds to a nozzle forming the first image, a circled reference numeral "2" corresponds to a nozzle forming the second image and a circled reference symbol "W" corresponds to a nozzle forming the background image with white ink. Further, in each pass, a circled reference numeral "1" corresponds to a nozzle forming dots of the first image, a circled reference numeral "2" corresponds to a nozzle forming dots of the second image and a circled reference symbol "W" corresponds to a nozzle forming dots of the background image with white ink.

In the following description, in each pass, ink is discharged in the forward path of the head 41 and the ink is irradiated with ultraviolet rays by the ultraviolet irradiation unit 90 in the backward path of the head 41 so that the discharged ink is cured. The intensity of the ultraviolet rays irradiated by the ultraviolet irradiation unit 90 is changed depending on the mode selected as described above. That is to say, when the transmission mode is selected, the intensity of the ultraviolet rays can be higher than that in the case where the reflection mode is selected, for example.

Referring to FIG. 13, the printable area is from a twenty-fifth raster line downward. The order of formation of dots is described with reference to the twenty-fifth raster line to a twenty-eighth raster line, for example.

Dots of the first image are formed on the twenty-fifth raster line on the film sheet S with the nozzle #7 of YMCK in pass 1. In this case, the film sheet S is transported by ¼ nozzle pitch in the transportation direction every time one pass is completed.

Then, dots of the first image are formed on the twenty-sixth raster line on the film sheet S with the nozzle #7 of YMCK in pass 2. Dots of the first image are formed on the twenty-seventh raster line on the film sheet S with the nozzle #7 of YMCK in pass 3. Dots of the first image are formed on the twenty-eighth raster line on the film sheet S with the nozzle #7 of YMCK in pass 4.

Dots of the background image are formed on the twenty-fifth raster line on the first image with the nozzle #4 of white W in pass 5. Dots of the background image are formed on the twenty-sixth raster line on the first image with the nozzle #4 of white W in pass 6. Dots of the background image are formed on the twenty-seventh raster line on the first image with the nozzle #4 of white W in pass 7. Dots of the background image are formed on the twenty-eighth raster line on the first image with the nozzle #4 of white W in pass 8.

Dots of the second image are formed on the twenty-fifth raster line on the background image with the nozzle #1 of YMCK in pass 9. Dots of the second image are formed on the twenty-sixth raster line on the background image with the nozzle #4 of YMCK in pass 10. Dots of the second image are formed on the twenty-seventh raster line on the background image with the nozzle #4 of YMCK in pass 11. Dots of the second image are formed on the twenty-eighth raster line on the background image with the nozzle #4 of YMCK in pass 12.

Thus, the film sheet S is transported by 2 and ¼ nozzle pitches in the transportation direction after dots for 12 passes are formed. Then, the formation of dots as described above is repeated. This makes it possible that the first image is printed on the film sheet S, the background image is printed on the first image, and then the second image is printed on the background image at the printable area.

As a modification of the above embodiment, the nozzles at the same block hit one raster a plurality of times so that dots on one raster may be printed with the nozzles at the same block in the plurality of times of passes.

Second Embodiment

Figure 14:
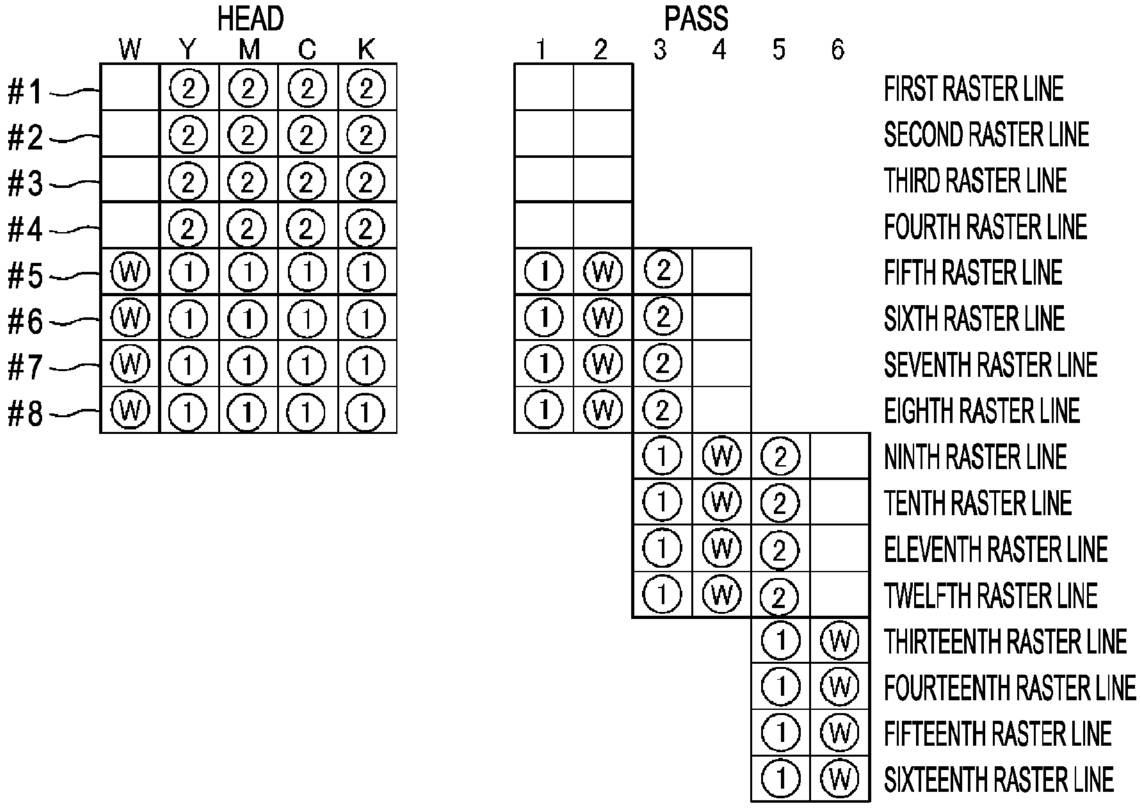
FIG. 14 is a diagram explaining the band printing according to a second embodiment.

FIG. 14 is a diagram explaining the band printing according to the second embodiment. As shown in FIG. 14, a head includes nozzle rows of white W, yellow Y, magenta M, cyan C and black K. Each nozzle row is assumed to have eight nozzles and nozzle numbers of #1 to #8 are assigned to the eight nozzles, respectively, for simplification of explanation. On the right side of the head in FIG. 14, which nozzles form dots on raster lines at each pass is shown.

In the following description, in each pass, ink is discharged in the forward path of the head 41 and the ink is irradiated with ultraviolet rays by the ultraviolet irradiation unit 90 in the backward path of the head 41 so that the discharged ink is cured. The intensity of the ultraviolet rays irradiated by the ultraviolet irradiation unit 90 is changed depending on the mode selected as described above. That is to say, when the transmission mode is selected, the intensity of the ultraviolet rays can be higher than that in the case where the reflection mode is selected.

Referring to FIG. 14, the printable area is from a fifth raster line downward. The order of formation of dots is described with reference to the fifth raster line to an eighth raster line, for example.

Dots of the first image are formed on the fifth raster line to the eighth raster line on the film sheet S with the nozzles #5 to #8 of YMCK in pass 1. Then, the film sheet S is not transported in the transportation direction and dots of the background image are formed on the fifth raster line to the eighth raster line on the first image with the nozzles #5 to #8 of white W in pass 2. In this case, the film sheet S is transported by 4 nozzle pitches in the transportation direction every time two passes are completed.

Dots of the second image are formed on the fifth raster line to the eighth raster line on the background image with the nozzles #1 to #4 of YMCK in pass 3. At this time, dots of the first image are formed on the ninth raster line to the twelfth raster line. Images are not formed on the fifth raster line to the eighth raster line in pass 4. However, dots of the background image are formed on the ninth raster line to the twelfth raster line in pass 4. Then, the film sheet S is transported by 4 nozzle pitches in the transportation direction. Subsequently, operations in the passes 3 and 4 are repeated so that the first image is printed on the film sheet S, the background image is printed on the first image, and then the second image is printed on the background image at the printable area.

Figure 15:
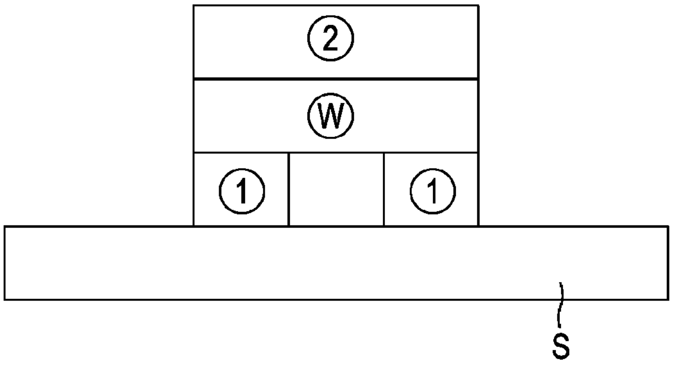
FIG. 15 is a diagram explaining a state of superimposed inks in the interlace printing according to the second embodiment.

FIG. 15 is a diagram explaining a state of superimposed inks in the interlace printing according to the second embodiment. In FIG. 15, the order of dots formed so as to be superimposed on the film sheet S is shown. FIG. 15 is different from FIG. 9 in that dots are not formed on some pixels on a layer on which the first image is formed because the first image is printed at a lower resolution than that in the case of the second image.

Figure 16:
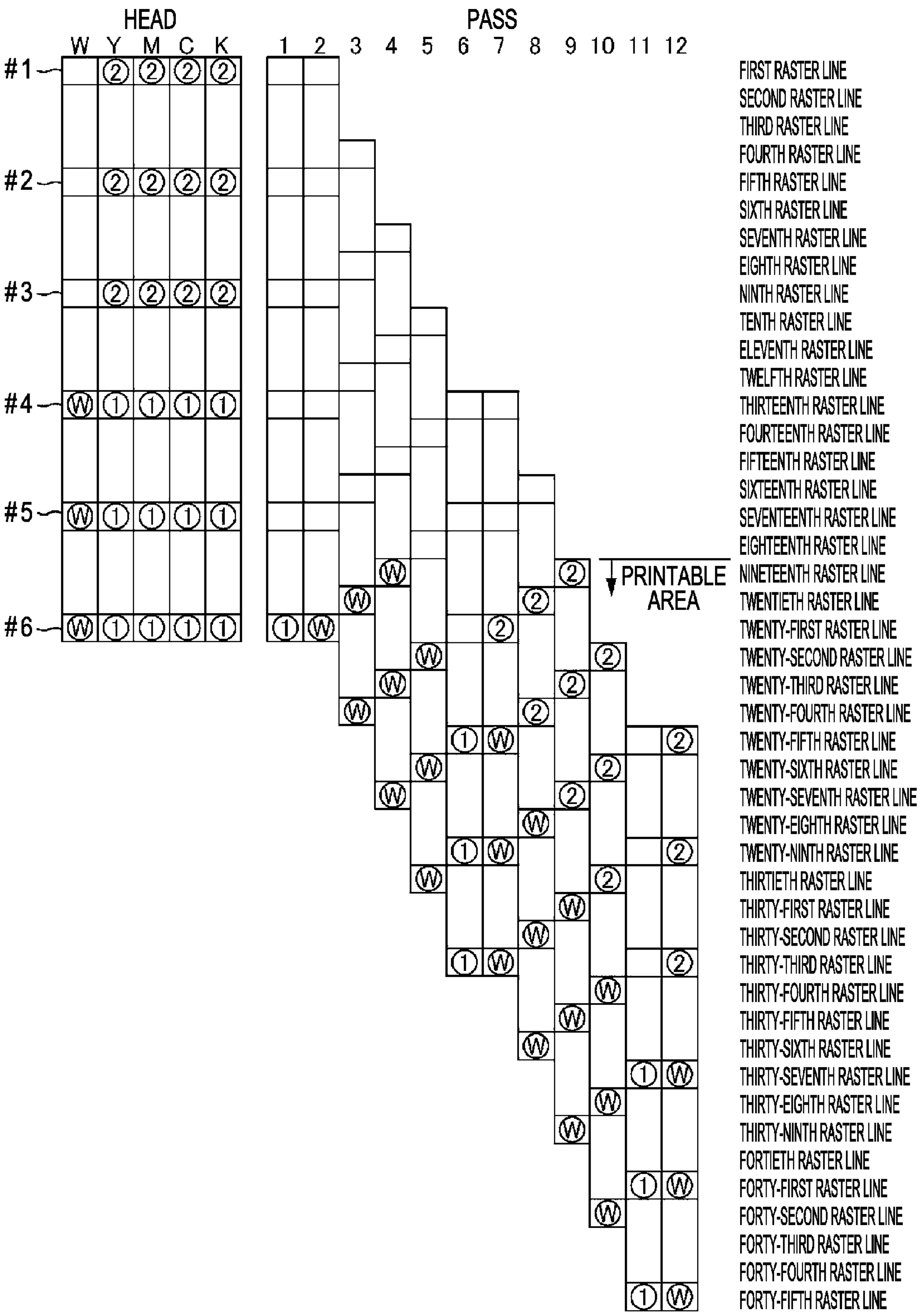
FIG. 16 is a diagram explaining the interlace printing according to the second embodiment.

FIG. 16 is a diagram explaining the interlace printing according to the second embodiment. As shown in FIG. 16, a head includes nozzle rows of white W, yellow Y, magenta M, cyan C and black K. Each nozzle row is assumed to have six nozzles and nozzle numbers of #1 to #6 are assigned to the six nozzles, respectively, for simplification of explanation.

Referring to FIG. 16, the printable area is from a nineteenth raster line downward. For example, the order of formation of dots is described with reference to the nineteenth raster line to a twenty-first raster line, for example.

Dots of the first image are formed on the twenty-first raster line on the film sheet S with the nozzle #6 of YMCK in pass 1. In this case, the film sheet S is not transported after the dots of the first image are formed. Then, dots of the background image are formed on the twenty-first raster line on the first image with the nozzle #6 of white W in pass 2. Then, the film sheet S is transported by ¾ nozzle pitch.

Dots of the background image are formed on the twentieth raster line on the film sheet S with the nozzle #5 of white W in pass 3. Then, the film sheet is transported by ¾ nozzle pitch. Dots of the background image are formed on the nineteenth raster line on the film sheet S with the nozzle #4 of white W in pass 4. Then, the film sheet S is transported by ¾ nozzle pitch.

Dots of the background image are formed with the nozzle #4 and the like of white W in pass 5. However, dots are not formed on the nineteenth raster line to the twenty-first raster line in pass 5. Dots of the first image are also formed with the nozzle #4 and the like of YMCK in pass 6. However, dots are not formed on the nineteenth raster line to the twenty-first raster line in pass 6. As described above, since the film sheet S is not transported after the first image is formed, the film sheet S is not also transported at this time.

Dots of the second image are formed on the twenty-first raster line on the background image with the nozzle #3 of YMCK in pass 7. Then, the film sheet S is transported by ¾ nozzle pitch. Dots of the second image are formed on the twenties raster line on the background image with the nozzle #2 of YMCK in pass 8. Then, the film sheet S is transported by ¾ nozzle pitch. Dots of the second image are formed on the nineteenth raster line on the background image with the nozzle #1 of YMCK in pass 9.

Subsequently, the same printing processes are executed so that the first image is printed on the film sheet S, the background image is printed on the first image, and then the second image is printed on the background image at the printable area.

Executing such printing, the density of dots of the first image can be smaller than that of the second image so that the first image is printed at a lower resolution than that of the second image.

Figure 17:
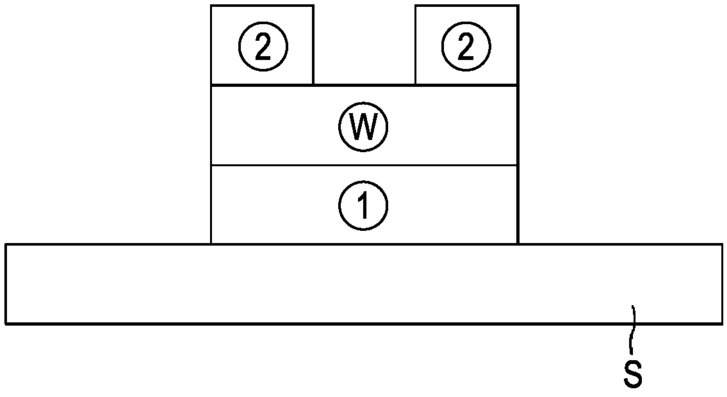
FIG. 17 is a diagram explaining a state of superimposed inks in the interlace printing when a resolution of the second image is low.

FIG. 17 is a diagram explaining a state of superimposed inks in the interlace printing when the resolution of the second image is low. The order of dots to be formed on the film sheet S in a superimposed manner is shown in FIG. 17. FIG. 17 is also different from FIG. 9 in that dots are not formed on some pixels on a layer on which the second image is formed because the second image is printed at a lower resolution than that of the first image.

Figure 18:
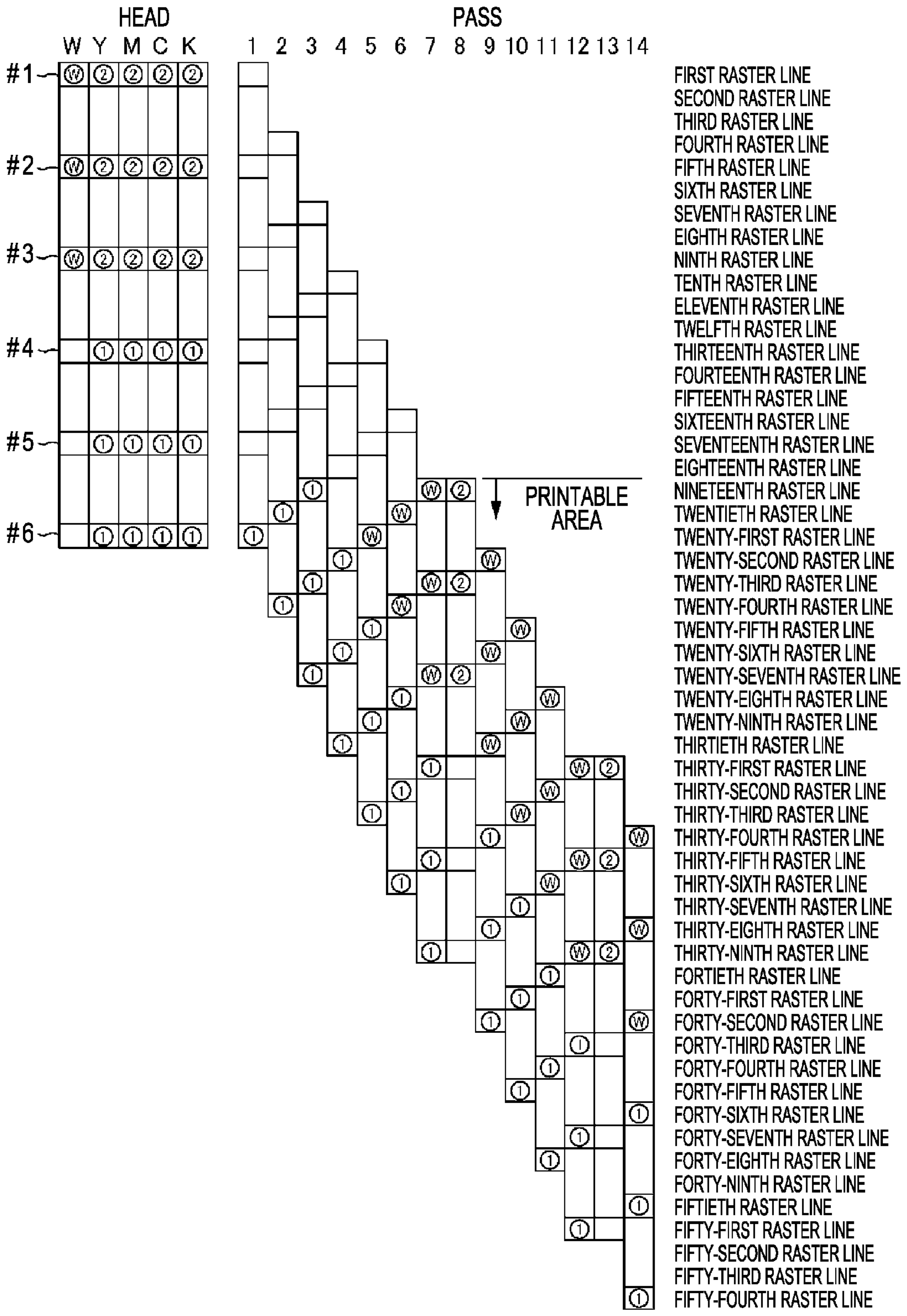
FIG. 18 is a diagram explaining the interlace printing when the resolution of the second image is low.

FIG. 18 is a view explaining the interlace printing when the resolution of the second image is low.

In the following description, in each pass, ink is discharged in the forward path of the head 41 and the ink is irradiated with ultraviolet rays by the ultraviolet irradiation unit 90 in the backward path of the head 41 so that the discharged ink is cured. The intensity of the ultraviolet rays irradiated by the ultraviolet irradiation unit 90 is changed depending on the mode selected as described above. That is to say, when the transmission mode is selected, the intensity of the ultraviolet ray can be higher than that in the case where the reflection mode is selected.

Referring to FIG. 18, the printable area is from a nineteenth raster line downward. The order of formation of dots is described with reference to the nineteenth raster line to a twenty-first raster line, for example.

Dots of the first image are formed on the twenty-first raster line on the film sheet S with the nozzle #6 of YMCK in pass 1. Then, the film sheet S is transported by ¾ nozzle pitch. The film sheet S is transported by ¾ pitch for each pass until pass 7.

Dots of the first image are formed on the twentieth raster line on the film sheet S with the nozzle #5 of YMCK in pass 2. Dots of the first image are formed on the nineteenth raster line on the film sheet S with the nozzle #4 and the like of YMCK in pass 3. Dots of the first image are formed with the nozzle #4 and the like of YMCK in pass 4. However, dots are not formed on the nineteenth raster line to the twenty-first raster line in pass 4.

Dots of the background image are formed on the twenty-first raster line on the first image with the nozzle #3 of white W in pass 5. Dots of the background image are formed on the twentieth raster line on the first image with the nozzle #2 of white W in pass 6. Dots of the background image are formed on the nineteenth raster line on the first image with the nozzle #1 of white W in pass 7. In this case, the film sheet S is not transported immediately before the second image is formed. Since the second image is to be formed in the next pass, the film sheet S is not transported at this time.

Dots of the second image are formed on the nineteenth raster line on the background image with the nozzle #1 of YMCK in pass 9.

Subsequently, the same printing processes are executed so that the first image is printed on the film sheet S, the background image is printed on the first image, and then the second image is printed on the background image at the printable area.

Executing such printing, the density of dots of the second image can be lower than that of the first image so that the second image is printed at a lower resolution than that of the first image.

Figure 19:
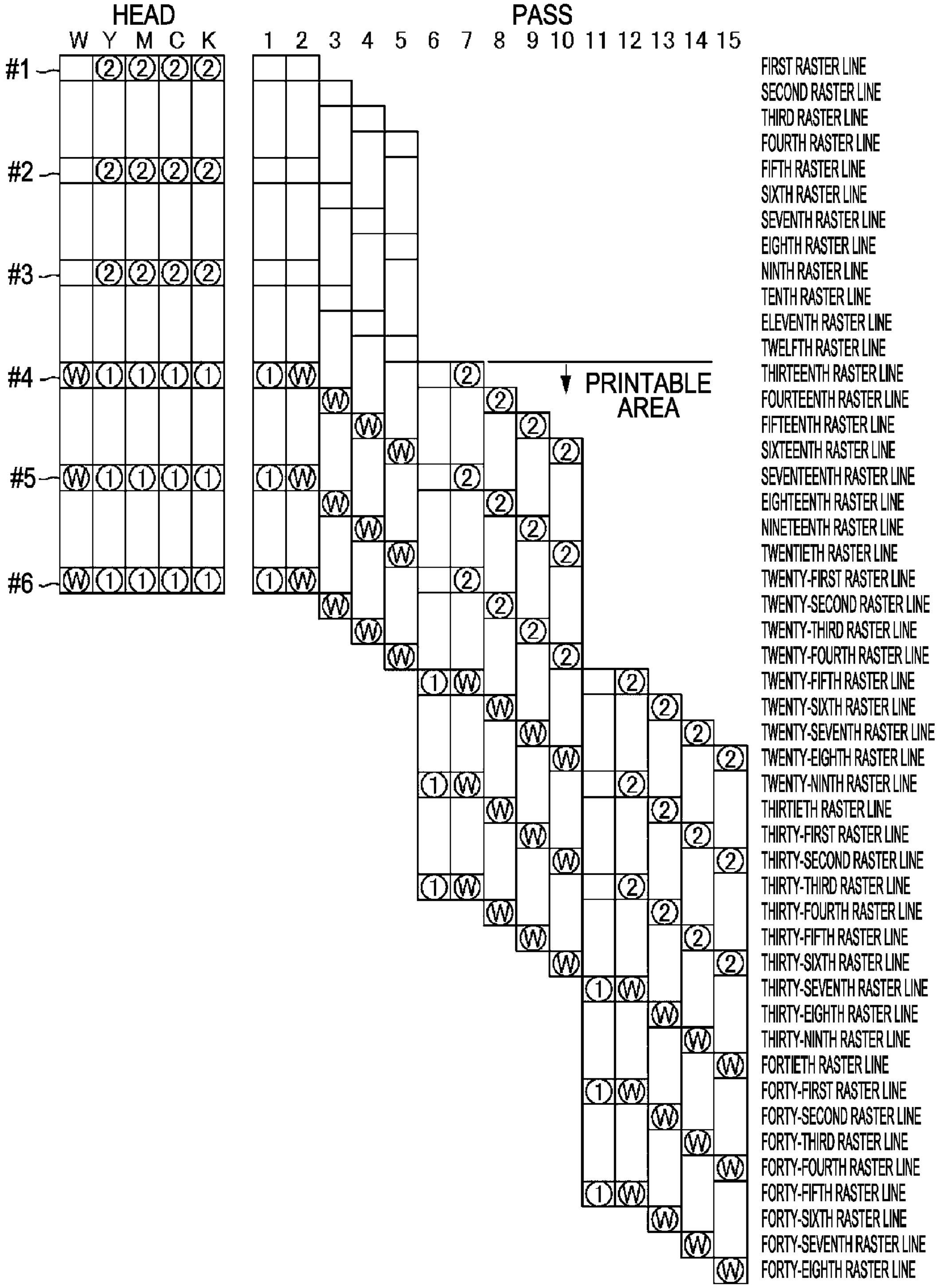
FIG. 19 is a diagram explaining the micro-feed printing according to the second embodiment.

FIG. 19 is a diagram explaining the micro-feed printing according to the second embodiment. As shown in FIG. 19, a head includes nozzle rows of white W, yellow Y, magenta M, cyan C and black K. Each nozzle row is assumed to have six nozzles and nozzle numbers of #1 to #6 are assigned to the six nozzles, respectively, for simplification of explanation.

Referring to FIG. 19, the printable area is from a thirteenth raster line downward. In the micro-feed printing according to the second embodiment, formations of dots in pass 1 to pass 10 are repeated. The order of formation of dots is described with reference to the thirteenth raster line to a sixteenth raster line, for example.

Dots of the first image are formed on the thirteenth raster line on the film sheet S with the nozzle #4 of YMCK in pass 1. The film sheet S is not transported in pass 1 and pass 2. Dots of the background image are formed on the thirteenth raster line on the first image with the nozzles #4 of white W in pass 2. Then, the film sheet S is transported by ¼ nozzle pitch.

Dots of the background image are formed on the fourteenth raster line on the film sheet S with the nozzle #4 of white W in pass 3. The film sheet S is transported by ¼ nozzle pitch per pass in pass 3 to pass 5. Therefore, the film sheet S is transported by ¾ nozzle pitch at this time. Dots of the background image are formed on the fifteenth raster line on the film sheet S with the nozzle #4 of white W in pass 4. Dots of the background image are formed on the sixteenth raster line on the film sheet S with the nozzle #4 of white W in pass 5.

The film sheet S is transported by 2 and ¼ nozzle pitches after pass 5. Dots of the first image are formed with the nozzle #4 and the like of YMCK in pass 6. However, dots are not formed on the thirteenth raster line to the sixteenth raster line. The film sheet S is not transported in pass 6 and pass 7.

Dots of the second image are formed on the thirteenth raster line on the background image with the nozzle #1 of YMCK in pass 7. The film sheet S is transported by ¾ nozzle pitch per pass in pass 8 to pass 10. Dots of the second image are formed on the fourteenth raster line on the background image with the nozzle #1 of YMCK in pass 8. Dots of the second image are formed or the fifteenth raster line on the background image with the nozzle #1 of YMCK in pass 9. Dots of the second image are formed on the sixteenth raster line on the background image with the nozzle #1 of YMCK in pass 10.

The film sheet S is transported by 2 and ¼ nozzle pitches at pass 11 and thereinafter. Subsequently, operations in pass 1 to pass 10 are repeated.

In this manner, the first image is printed on the film sheet S, the background image is printed on the first image, and then the second image is printed on the background image at the printable area. Further, the density of dots of the first image can be lower than that of the second image so that the first image is printed at a lower resolution than that of the second image.

Figure 20:
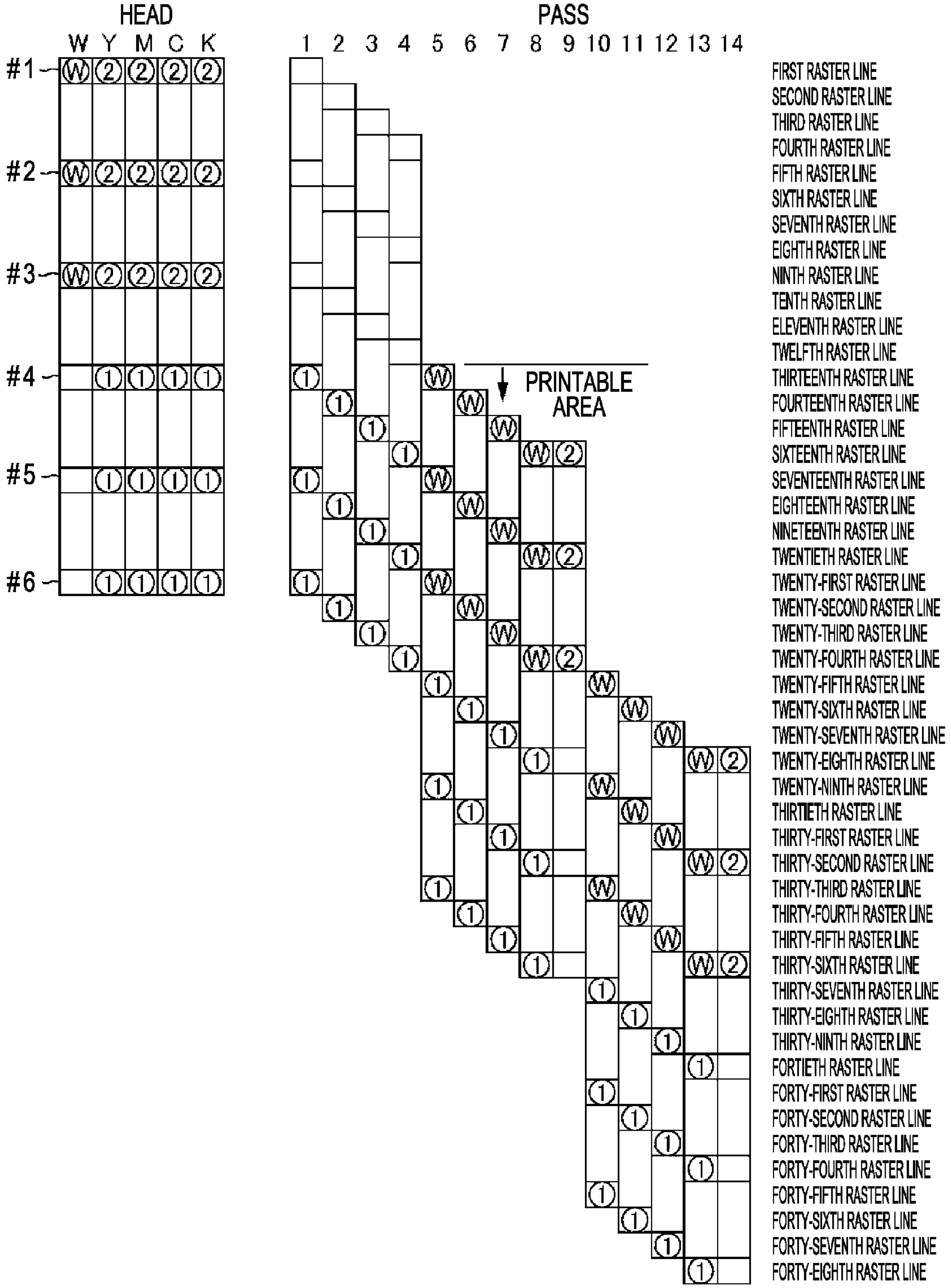
FIG. 20 is a diagram explaining the micro-feed printing when the resolution of the second image is low.

FIG. 20 is a diagram explaining the micro-feed printing when the resolution of the second image is low. Also referring to FIG. 20, the printable area is from a thirteenth raster line downward. In the micro-feed printing according to the second embodiment, formations of dots in pass 1 to pass 10 are repeated. The order of formation of dots is described with reference to the thirteenth raster line to a sixteenth raster line, for example.

Dots of the first image are formed on the thirteenth raster line on the film sheet S with the nozzle #4 of YMCK in pass 1. The film sheet S is transported by ¼ nozzle pitch per pass in pass 1 to pass 4. Dots of the first image are formed on the fourteenth raster line on the film sheet S with the nozzle #4 of YMCK in pass 2. Dots of the first image are formed on the fifteenth raster line on the film sheet S with the nozzle #4 of YMCK in pass 3. Dots of the first image are formed on the sixteenth raster line on the film sheet S with the nozzle #4 of YMCK in pass 4.

The film sheet S is transported by 2 and ¼ nozzle pitches at pass 5 and thereinafter.

Dots of the background image are formed on the thirteenth raster line on the first image with the nozzle #1 of white W in pass 5. The film sheet S is transported by ¼ nozzle pitch per pass in pass 5 to pass 8. Dots of the background image are formed on the fourteenth raster line on the first image with the nozzle #1 of white W in pass 6. Dots of the background image are formed on the fifteenth raster line on the first image with the nozzle #1 of white W in pass 7. Dots of the background image are formed on the sixteenth raster line on the first image with the nozzle #1 of white W in pass 8.

The film sheet S is not transported in pass 9. Dots of the second image are formed on the thirteenth raster line on the background image with the nozzle #1 of YMCK in pass 9. The film sheet S is transported by 2 and ¼ nozzle pitches at pass 10 and thereinafter. Subsequently, the operations in pass 1 to pass 9 are repeated.

In this manner, the first image is printed on the film sheet S, the background image is printed on the first image, and then the second image is printed on the background image at the printable area. Further, the density of dots of the second image can be lower than that of the first image so that the second image is printed at a lower resolution than that of the first image in this case.

Third Embodiment

Figure 21:
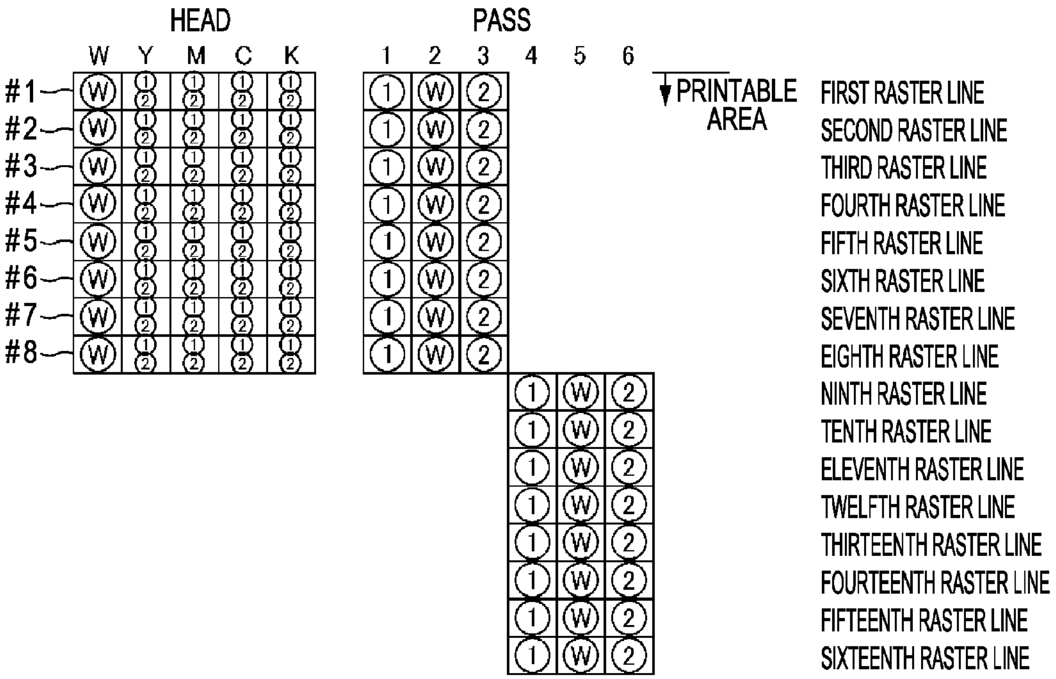
FIG. 21 is a diagram explaining the band printing according to a third embodiment.

FIG. 21 is a diagram explaining the band printing according to the third embodiment. As shown in FIG. 21, a head includes nozzle rows of white W, yellow Y, magenta M, cyan C and black K. Each nozzle row is assumed to have eight nozzles and nozzle numbers of #1 to #8 are assigned to the eight nozzles, respectively, for simplification of explanation. On the right side of the head in FIG. 21, which nozzles form dots on raster lines at each pass is shown.

In the following description, in each pass, ink is discharged in the forward path of the head 41 and the ink is irradiated with ultraviolet rays by the ultraviolet irradiation unit 90 in the backward path of the head 41 so that the discharged ink is cured. The intensity of the ultraviolet ray irradiated by the ultraviolet irradiation unit 90 is changed depending on the mode selected as described above. That is to say, when the transmission mode is selected, the intensity of the ultraviolet rays can be higher than that in the case where the reflection mode is selected.

Dots of the first image are formed on a first raster line to an eighth raster line on the film sheet S with the nozzles #1 to #8 of YMCK in pass 1. The film sheet S is not transported in pass 1 to pass 3. Dots of the background image are formed on the first raster line to the eighth raster line on the first image with the nozzles #1 to #8 of white W in pass 2. Dots of the second image are formed on the first raster line to the eighth raster line on the background image with the nozzles #1 to #8 of YMCK in pass 3. Then, the film sheet S is transported by 8 nozzle pitches at pass 4 and thereinafter. Subsequently, the above operations are repeated. In this manner, the first image is printed on the film sheet S, the background image is printed on the first image, and then the second image is printed on the background image at the printable area.

Figure 22:
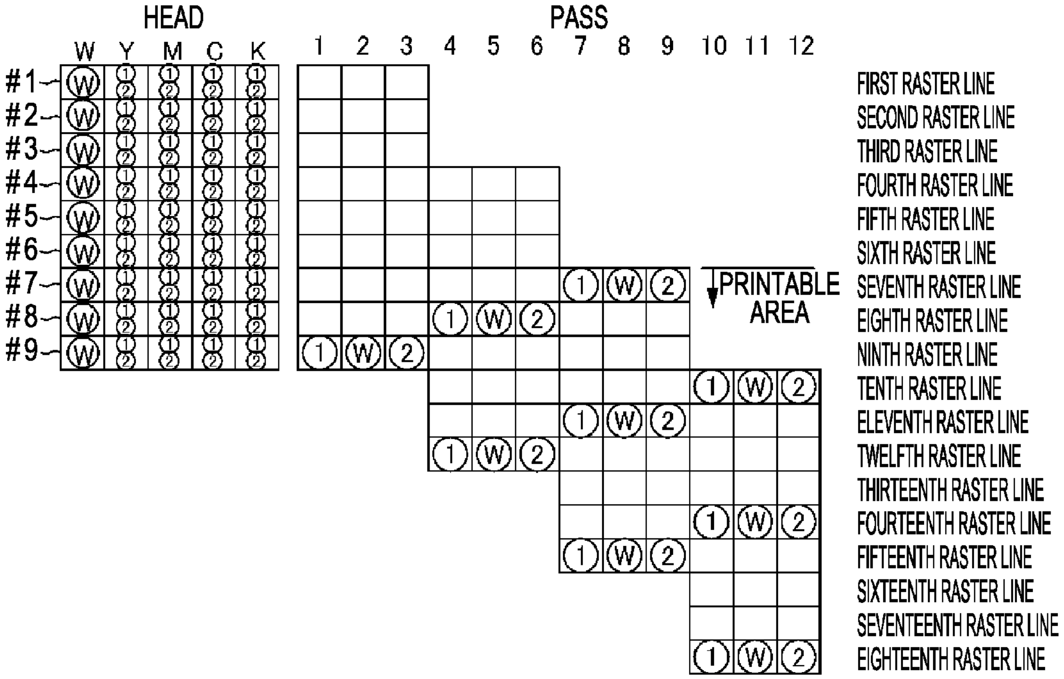
FIG. 22 is a diagram explaining the interlace printing according to the third embodiment.

FIG. 22 is a diagram explaining the interlace printing according to the third embodiment. As shown in FIG. 22, a head includes nozzle rows of white W, yellow Y, magenta M, cyan C and black K. Each nozzle row is assumed to have nine nozzles and nozzle numbers of #1 to #9 are assigned to the nine nozzles, respectively, for simplification of explanation.

On the right side of the head in FIG. 22, which nozzles form dots on raster lines at each pass is shown.

Referring to FIG. 22, the printable area is from a seventh raster line downward. In the interlace printing according to the third embodiment, formations of dots in pass 1 to pass 9 are repeated. The order of formation of dots is described with reference to the seventh raster line to a ninth raster line, for example.

Dots of the first image are formed on the ninth raster line on the film sheet S with the nozzle #9 of YMCK in pass 1. The film sheet S is not transported in pass 1 to pass 3. Dots of the background image are formed on the ninth raster line on the first image with the nozzle #9 of whit ink W in pass 2. Dots of the second image are formed on the ninth raster line on the background image with the nozzle #9 of YMCK in pass 3. In this case, the film sheet S is transported by 3 nozzle pitches per three passes. Therefore, the film sheet S is also transported by 3 nozzle pitches at this time.

Dots of the first image are formed on the eighth raster line on the film sheet S with the nozzle #5 of YMCK in pass 4. The film sheet S is not transported in pass 4 to pass 6. Dots of the background image are formed on the eighth raster line on the first image with the nozzle #5 of whit ink W in pass 5. Dots of the second image are formed on the eighth raster line on the background image with the nozzle #5 of YMCK in pass 6. Then, the film sheet S is transported by 3 nozzle pitches.

Dots of the first image are formed on the seventh raster line on the film sheet S with the nozzle #1 of YMCK in pass 7. The film sheet S is not transported in pass 7 to pass 9. Dots of the background image are formed on the seventh raster line on the first image with the nozzle #1 of whit ink W in pass 8. Dots of the second image are formed on the seventh raster line on the background image with the nozzle #1 of YMCK in pass 9. Then, the film sheet S is transported by 3 nozzle pitches. Subsequently, operations in pass 1 to pass 9 are repeated.

In this manner, the first image is printed on the film sheet S, the background image is printed on the first image, and then the second image is printed on the background image.

Figure 23:
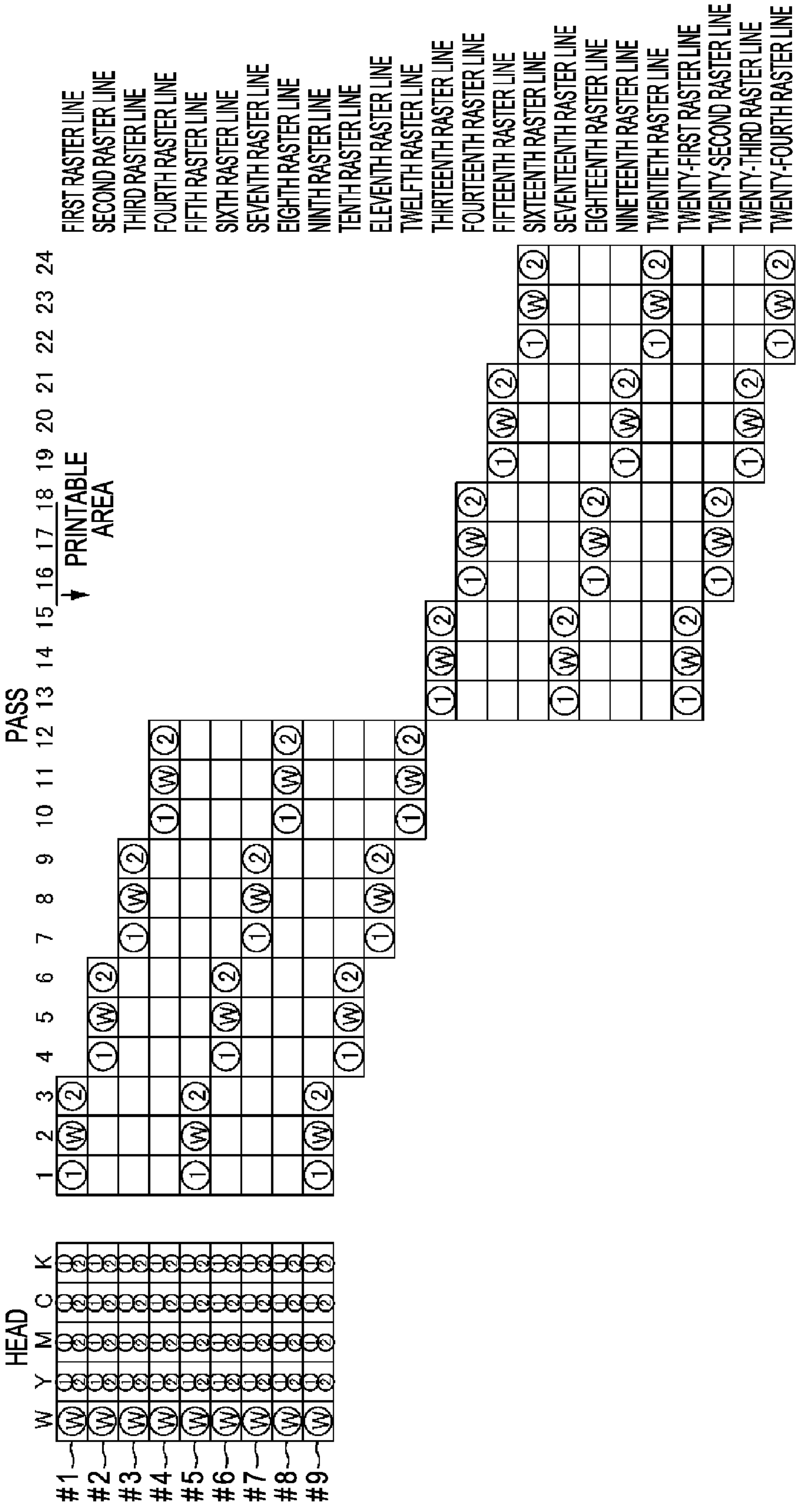
FIG. 23 is a diagram explaining the micro-feed printing according to the third embodiment.

FIG. 23 is a diagram explaining the micro-feed printing according to the third embodiment. Each nozzle row also has nine nozzles and nozzle numbers of #1 to #9 are assigned to the nine nozzles, respectively, for simplification of explanation.

In the following description, in each pass, ink is discharged in the forward path of the head 41 and the ink is irradiated with ultraviolet rays by the ultraviolet irradiation unit 90 in the backward path of the head 41 so that the discharged ink is cured. The intensity of the ultraviolet rays irradiated by the ultraviolet irradiation unit 90 is changed depending on the mode selected as described above. That is to say, when the transmission mode is selected, the intensity of the ultraviolet rays can be higher than that in the case where the reflection mode is selected.

Dots of the first image are formed on a first raster line on the film sheet S with the nozzle #1 of YMCK in pass 1. The film sheet S is not transported in pass 1 to pass 3. Dots of the background image are formed on the first raster line on the first image with the nozzle #1 of whit ink W in pass 2. Dots of the second image are formed on the first raster line on the background image in pass 3. Then, the film sheet S is transported by 1 nozzle pitch in the transportation direction.

The above operations in pass 1 to pass 3 are repeated during pass 4 to pass 12. Thus, the printing operations are executed on the first raster line to the twelfths raster line. The film sheet S is transported by 9 nozzle pitches at pass 13 and thereinafter. Then the above operations in pass 1 to pass 12 are repeated.

In this manner, the first image is printed on the film sheet S, the background image is printed on the first image, and then the second image is printed on the background image.

Fourth Embodiment

Figure 24:
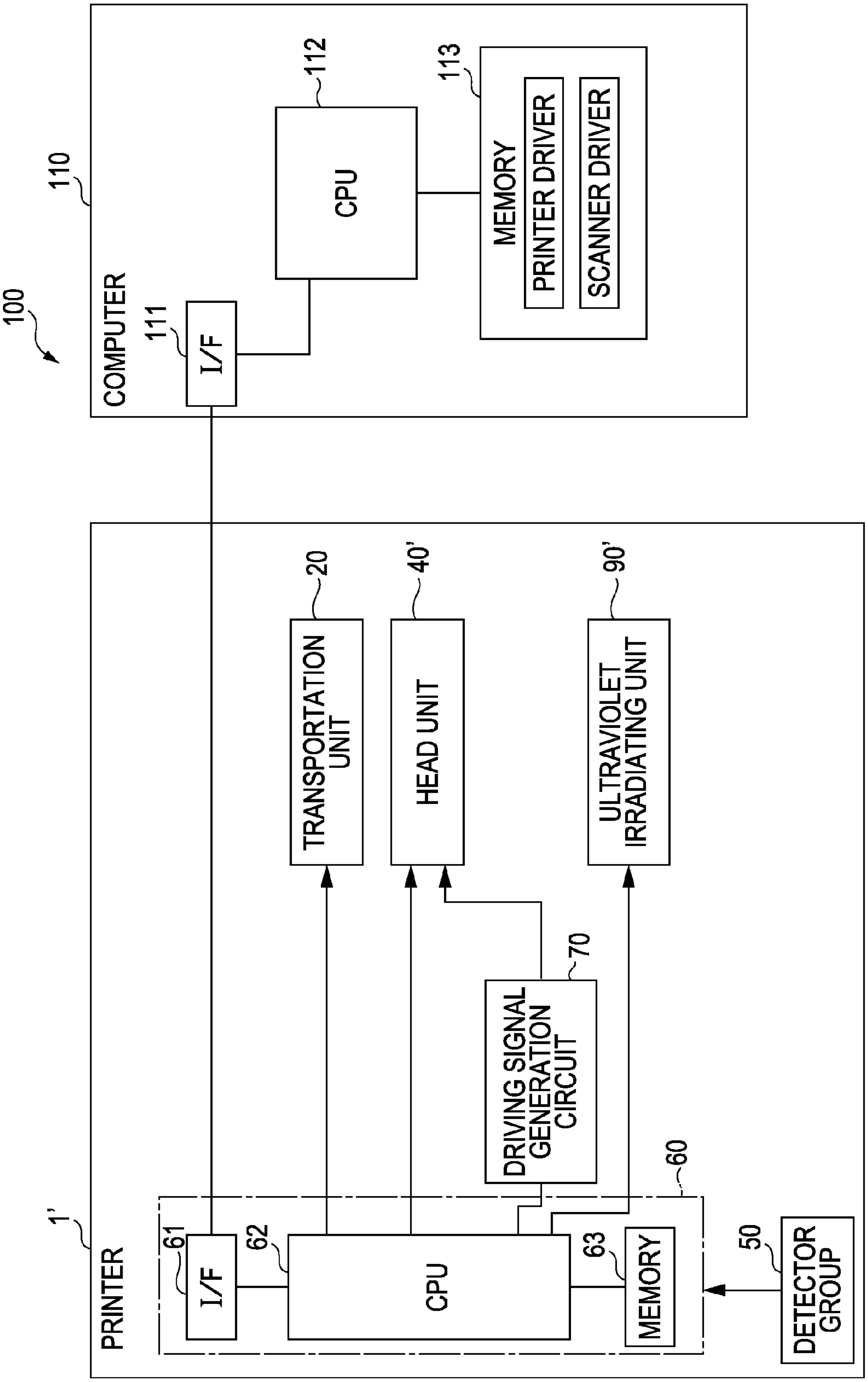
FIG. 24 is a block diagram illustrating a configuration of the printing system including a line printer.

FIG. 24 is a block diagram illustrating a configuration of the printing system 100 including a line printer 1'. The line printer 1' is different from the serial type ink jet printer 1 in that the head unit is fixed to the printer 1'. Further, an image is formed by ejecting ink from the head unit while the film sheet S is transported in the transportation direction. Therefore, the carriage unit 30 for moving the head is eliminated in FIG. 24.

Figure 25:
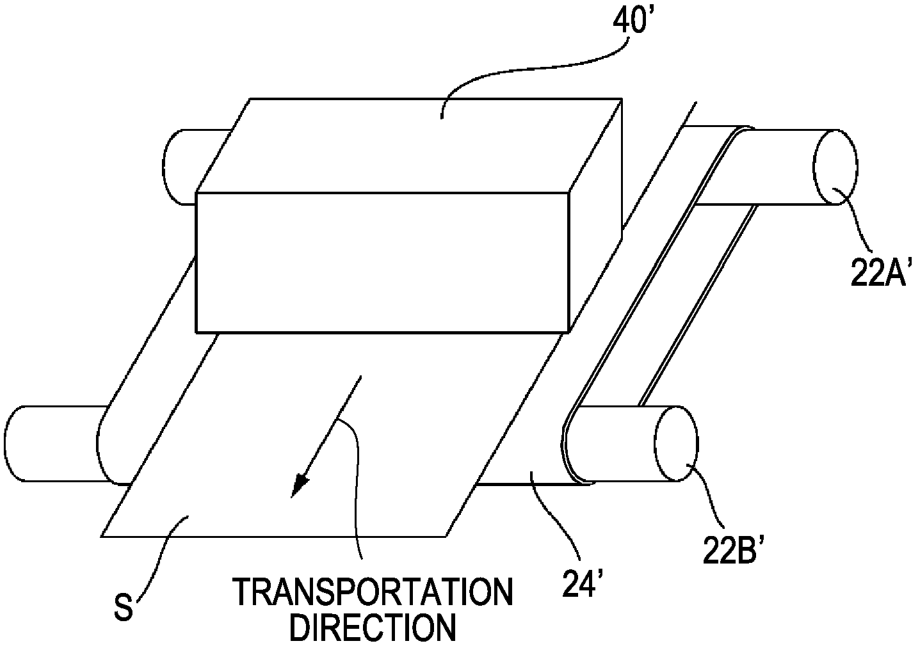
FIG. 25 is a perspective view of the line printer.

FIG. 25 is a perspective view of the line printer 1'. In FIG. 25, a head unit 40', a belt 24' for transporting the film sheet S, an upstream transportation roller 22A' and a downstream transportation roller 22B' are shown. As shown in FIG. 25, the film sheet S is moved in the transportation direction by the belt 24' in the line printer 1'. In addition, the belt 24' is moved by the transportation rollers.

Figure 26:
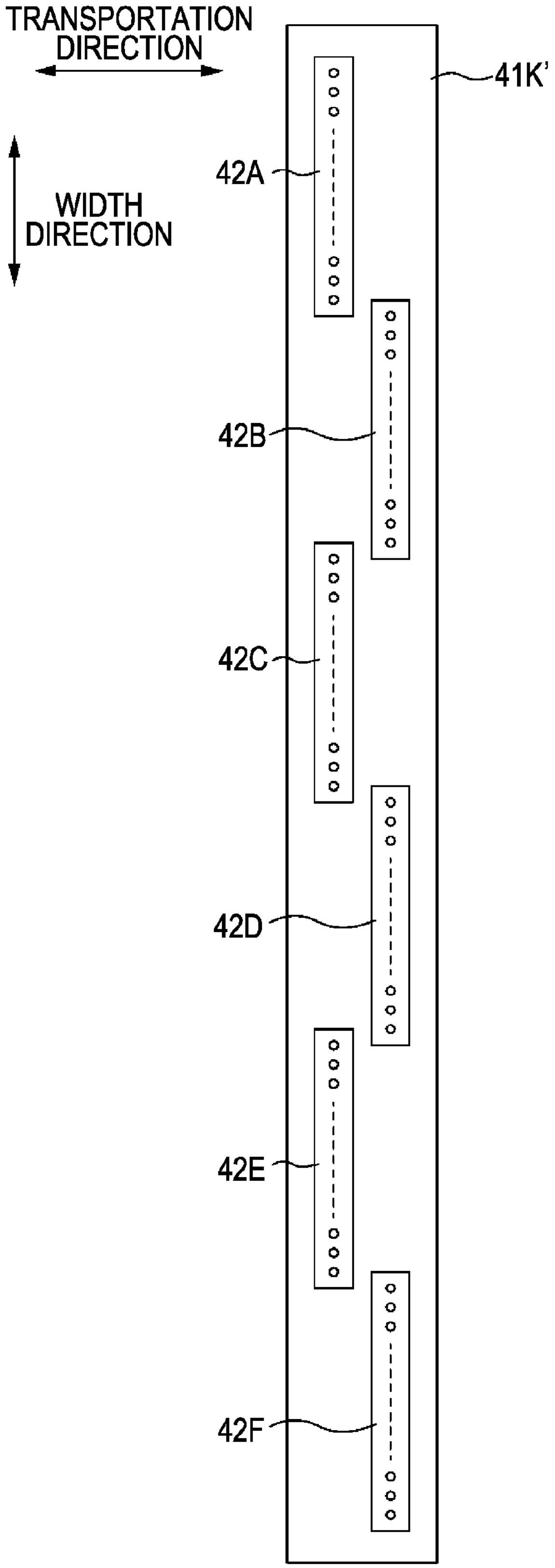
FIG. 26 is a diagram explaining a nozzle row unit in the line printer.

FIG. 26 is a diagram explaining a nozzle row unit 41' in the line printer 1'. The head unit 40' of the line printer 1' has a plurality of nozzle units 41' including a plurality of nozzle rows. Each of the plurality of nozzle rows is a nozzle row for one color. Although the nozzle row unit 41K' of black K is shown in FIG. 26, similar nozzle row units 41' of yellow Y, magenta M, cyan C, and white W are included.

Each nozzle unit 41' includes a first nozzle row 42A to a sixth nozzle row 42F. The entire area in the width direction of the film sheet S can be printed only once by arranging the plurality of nozzle rows in a zigzag alignment as shown in FIG. 26.

Figure 27:
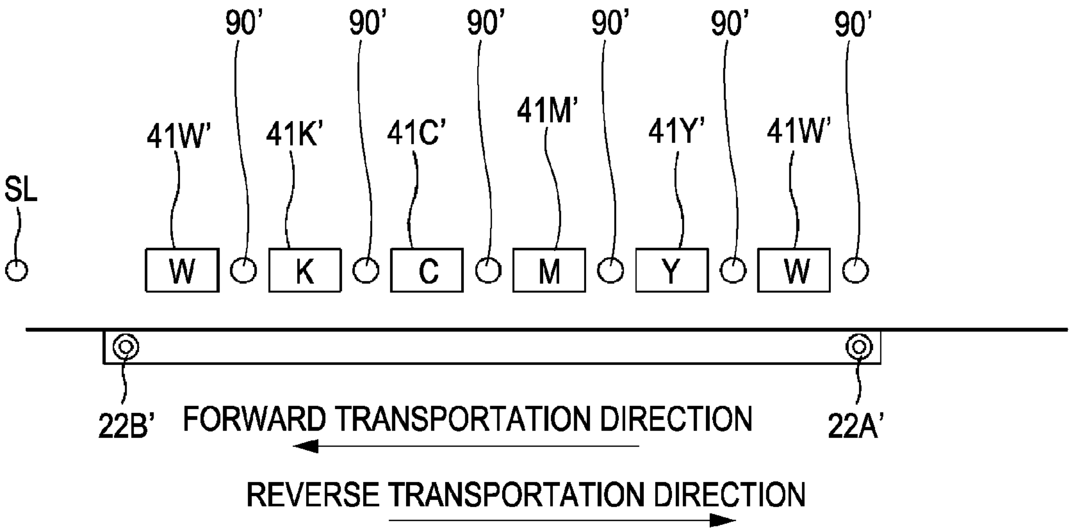
FIG. 27 is a diagram explaining printing in the line printer.

FIG. 27 is a diagram explaining printing in the line printer 1'. The nozzle row units 41' of each color and an ultraviolet irradiation unit 90' provided between each nozzle row unit 41' are shown in FIG. 27. The ultraviolet irradiation unit 90' is formed with an LED capable of irradiating ultraviolet rays. Ink can be cured by irradiating dots on the film sheet S with ultraviolet rays after each ink is ejected. It is to be noted that a circled reference symbol SL shown on the left side of FIG. 27 indicates an ultraviolet irradiation unit for strong irradiation and for irradiating ink on the film sheet S at the final finishing stage of printing so as to completely cure all the ink.

With such configuration, ink is ejected from each nozzle of YMCK to form the first image while the film sheet S is transported in the forward transportation direction. Then, ink is ejected from the nozzle of white W to form the background image while the film sheet S is transported in the reverse transportation direction. Further, ink is ejected from each nozzle of YMCK to form the second image while the film sheet S is transported in the forward transportation direction again.

The intensity of the ultraviolet rays irradiated by the ultraviolet irradiation unit 90 when the ink is discharged from the nozzle of white W to form the background image is changed depending on the selected mode. That is to say, when the transmission mode is selected, the intensity of the ultraviolet rays can be higher than that in the case where the reflection mode is selected.

Thus, when the reflection mode is selected, the first image can be seen through the film sheet S and the second image can be seen through from the opposite side. On the other hand, when the transmission mode is selected, the first image and the second image can be seen from both sides.

In the fourth embodiment, the degree of transmission of the background image formed with ink of white W is changed by changing the irradiation intensity of the ultraviolet rays depending on the mode. However, the degree of transmission of the background image formed with ink of white W may be changed by using image data of the background image formed by thinning out white dots as described above.

Two sets of color head of YMCK can be arranged at the upstream side and the downstream side in the transportation direction while sandwiching a single head of white W. Then, the first image may be printed with the color head of YMCK at the upstream side and the second image may be printed with the color head of YMCK at the downstream side. With this configuration, two printing modes can be executed in only one transportation direction by switching the first image and the second image.

Other Embodiments

Although the printer 1 is described as a printing apparatus in the above embodiments, the printing apparatus is not limited thereto. The invention can be embodied in an apparatus which ejects or discharges other fluids (liquid, liquid-like material in which particles of a functioning material are dispersed, or fluid-like material such as a gel) than ink. For example, the techniques described in the above embodiments may be applied to various types of apparatuses to which the ink jet technique is applied. Such various types of apparatuses include a color filter manufacturing apparatus, a dyeing apparatus, a microfabrication apparatus, a semiconductor manufacturing apparatus, a surface finishing apparatus, a three-dimensional modeling apparatus, a vaporizer, an organic EL manufacturing apparatus (particularly, polymer EL manufacturing apparatus), a display manufacturing apparatus, a thin-film deposition apparatus, a DNA chip manufacturing apparatus. In addition, methods or production methods thereof are within the application range.

The above embodiments are described for making understanding of the invention easier and are not intended to limit the invention. It is needless to say that modifications and improvements may be made without departing from the scope of the invention and the equivalents thereof are included in the invention.

Head

Ink is discharged by using a piezoelectric element in the above embodiments. However, a system of discharging liquids is not limited thereto and another system such as a system of generating foams in nozzles with heat may be used.

The entire disclosure of Japanese Patent Application No. 2009-096329, filed Apr. 10, 2009 is expressly incorporated by reference herein.

What is claimed is:

1. A printing apparatus which prints an image on a medium, comprising:

a head which discharges ink droplets from nozzles; and a controller that controls the head;

an irradiating unit that irradiates the ink with ultraviolet rays;

wherein when a reflection mode is selected, the controller controls the head to print a first image on the medium, to print a background image on the first image, and to print a second image on the background image;

wherein when a transmission mode is selected, the controller controls the head to print the first image on the medium, to print the background image on the first image so that the background image partially covers the first image, and to print the second image on the background image such that a part of the second image is in contact with a part of the first image;

wherein ink for a background image has a property that the ink is cured when irradiated with the ultraviolet rays; and wherein when the transmission mode is selected, the controller controls the irradiating unit such that an amount of the ultraviolet rays irradiated on the ink for the background image is greater in the transmission mode than in the reflection mode.

2. The printing apparatus according to claim 1, wherein the print resolution of the first image is different from that of the second image.

3. The printing apparatus according to claim 1, wherein when the transmission mode is selected, the controller controls the head to decrease an amount of the ink discharged for the background image printed per predetermined area on the medium from an amount of the ink discharged for the background image printed per predetermined area on the medium in the reflection mode.

4. A printing method comprising:

selecting one of a reflection mode and a transmission mode;

wherein, when the reflection mode is selected, controlling a print head to print a first image on a medium, to print a background image on the first image, and to print a second image on the background image; and when a transmission mode is selected, controlling the print head to print the first image on the medium, to print the background image on the first image so that the background image partially covers the first image, and to print the second image on the background image, and controlling an irradiating unit such that an amount of the ultraviolet rays irradiated on the ink for the background image is greater in the transmission mode than in the reflection mode, the ink for the background image having a property that the ink is cured when irradiated with the ultraviolet rays.

5. The printing apparatus according to claim 1, further comprising;

a medium transporting unit that transports the medium in a forward transportation direction and a reverse transportation direction;

wherein, when the first image is printed, the controller controls the medium transporting unit to transport the medium in the forward transportation direction;

when the background image is printed, the controller controls the medium transporting unit to transport the medium in the reverse transportation direction; and when the second image is printed, the controller controls the medium transporting unit to transport the medium in the forward transportation direction.

* * * * *